United States Patent [19]

Foster

[11] Patent Number: 4,510,740
[45] Date of Patent: Apr. 16, 1985

[54] TOBACCO HARVESTER

[76] Inventor: Ronald L. Foster, Rte. 1, Box 89, Dearborn, Mo. 64439

[21] Appl. No.: 576,881

[22] Filed: Feb. 3, 1984

[51] Int. Cl.³ .............................................. A01D 45/16
[52] U.S. Cl. ........................................ 56/27.5; 414/26
[58] Field of Search ............................. 56/27.5; 414/26

[56] References Cited

U.S. PATENT DOCUMENTS

| | | | |
|---|---|---|---|
| 2,923,116 | 2/1960 | Brown | 56/27.5 |
| 3,059,401 | 10/1962 | Woods | 56/27.5 |
| 3,262,587 | 7/1966 | Anderson | 414/26 |
| 3,593,506 | 7/1971 | Casada et al. | 56/27.5 |
| 3,798,884 | 3/1974 | Middleton | 56/27.5 |
| 3,855,762 | 12/1974 | Middleton | 56/27.5 |
| 3,997,066 | 12/1976 | Thielen | 414/26 |
| 4,037,666 | 7/1977 | Rath | 56/27.5 |
| 4,212,145 | 7/1980 | Middleton | 56/27.5 |
| 4,301,645 | 11/1981 | Spratt et al. | 56/27.5 |
| 4,353,200 | 10/1982 | Taylor, Jr. | 56/27.5 |
| 4,444,001 | 4/1984 | Thurnau et al. | 56/27.5 |

FOREIGN PATENT DOCUMENTS 1020050  5/1983  U.S.S.R. ............... 56/27.5

*Primary Examiner*—Paul J. Hirsch
*Attorney, Agent, or Firm*—Litman, Day & McMahon

[57] ABSTRACT

A tobacco harvester includes a self-propelled vehicle frame having driven front wheels and steerable rear wheels. A pair of harvester units are positioned side-by-side on the frame and each unit includes mechanisms for harvesting a row of tobacco plants. Each unit includes a tobacco stalk gripper which conveys a stalk into a cutting blade and which cooperates with an impalement conveyor to impale a stalk onto a tobacco stalk spear positioned longitudinally of the subframe. The impalement conveyor transfers the stalks to one or more stalk conveyors which slide the stalks along the spear toward a stick loading conveyor. The stalk conveyors are operated to time the travel of the stalks between the cutter and the stick loading conveyor. The stick loading conveyor is positioned opposite a stick supplier or magazine which holds a supply of tobacco sticks. A stick positioner receives the sticks one at a time from the magazine and places them on the stick loading conveyor aligned with the stalk spear. When the required number of tobacco plants have been impaled on the tobacco stick, the stick loading conveyor pivots rearwardly to orient the loaded stick vertically. A punch mechanism forms a hole in the ground, and a stick setting mechanism transfers the loaded stick from the stick loading conveyor to the hole and releases it.

33 Claims, 29 Drawing Figures

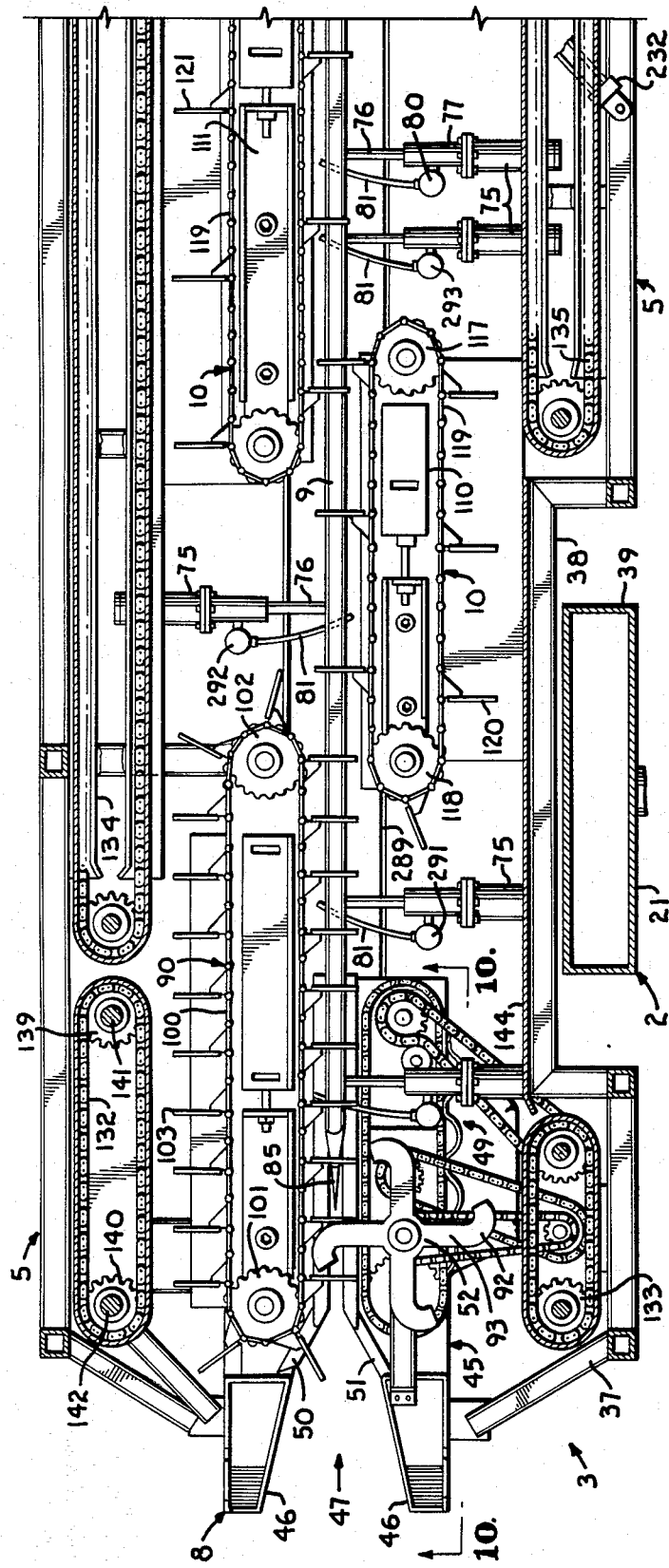
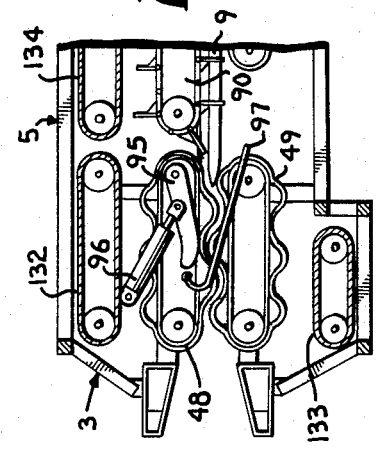
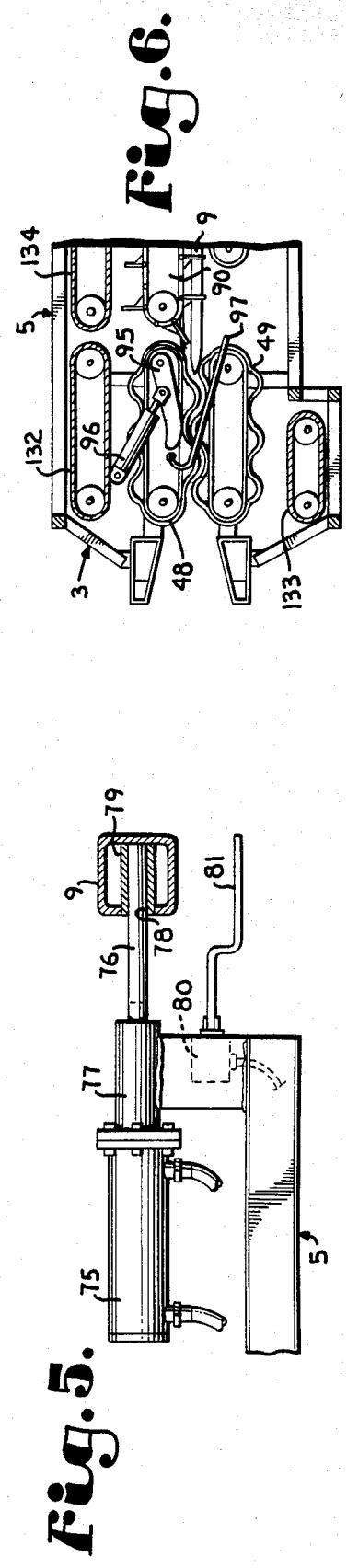

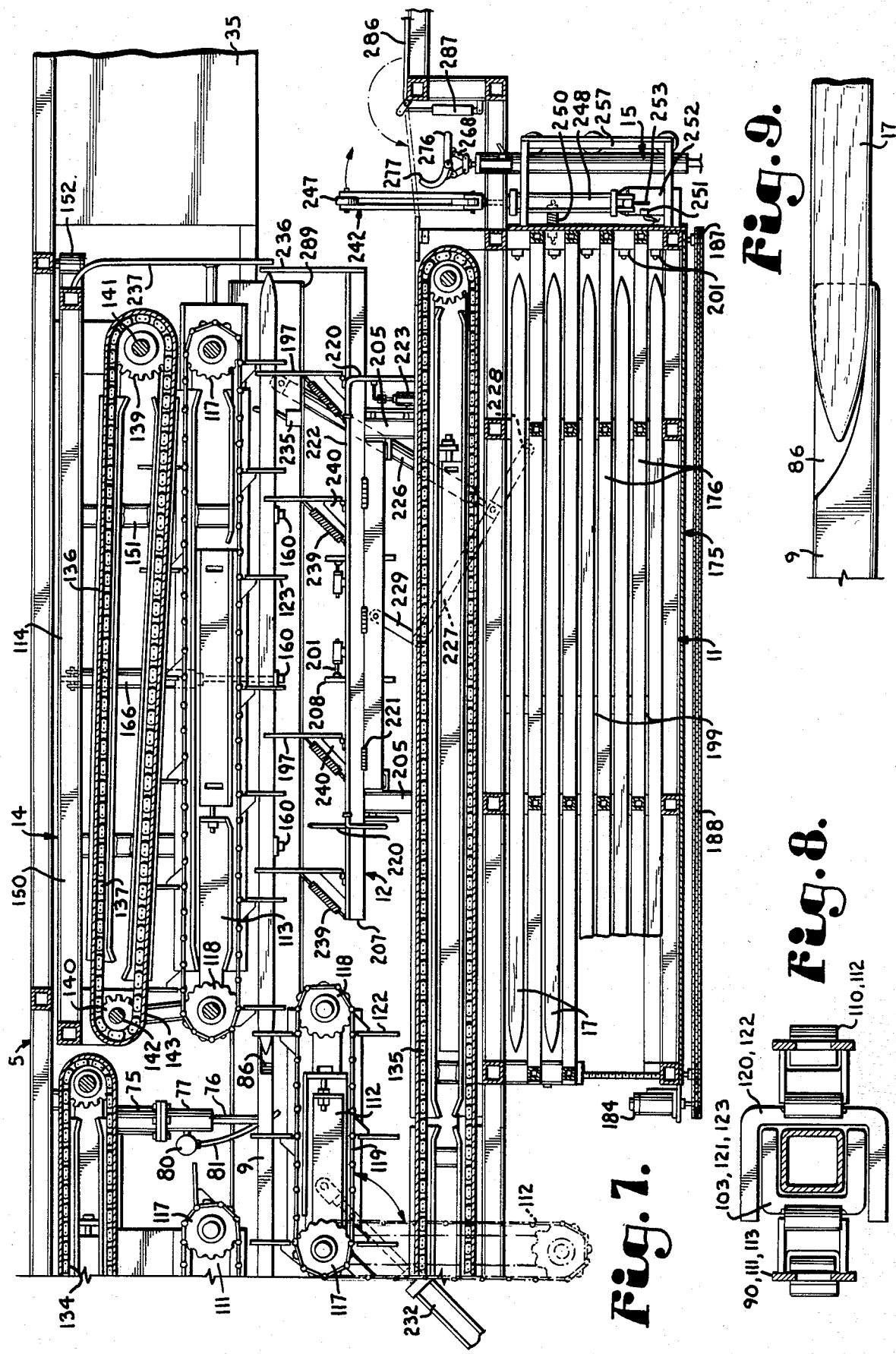

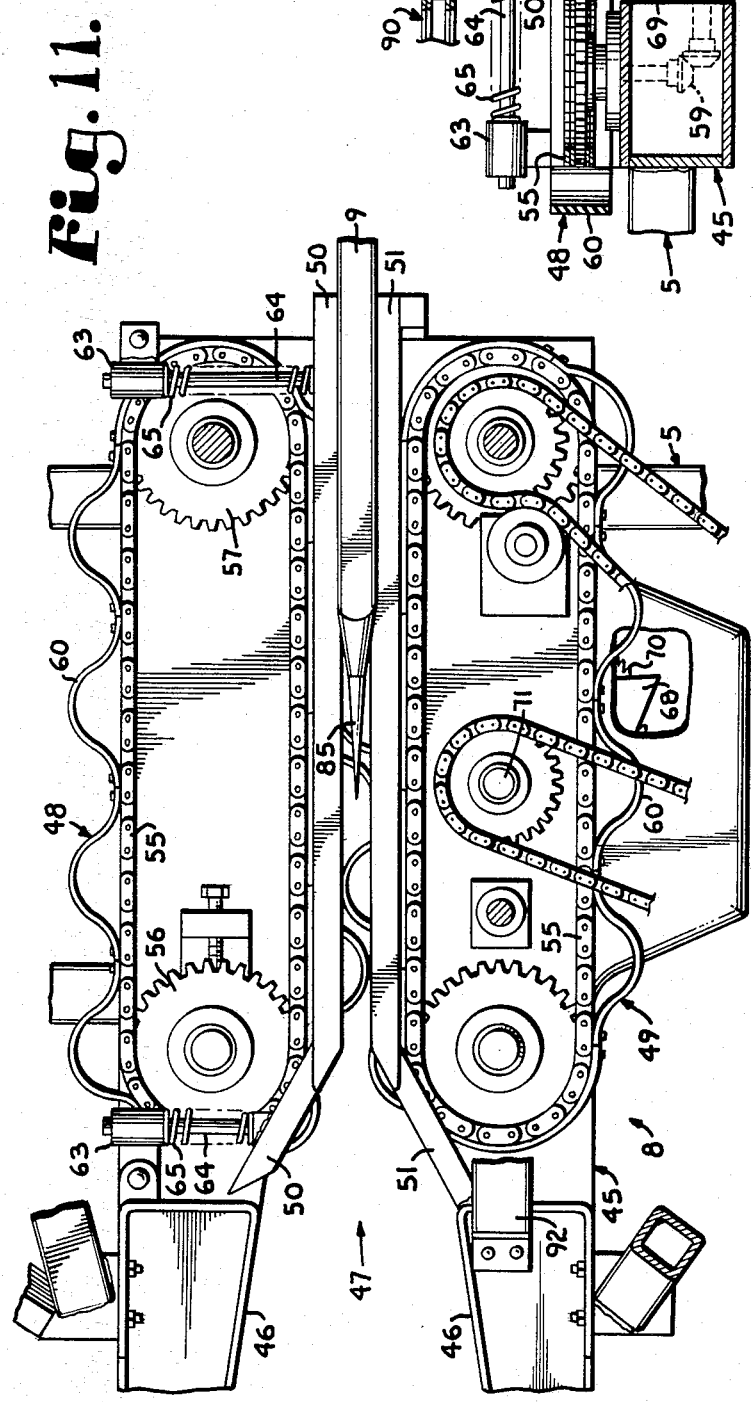
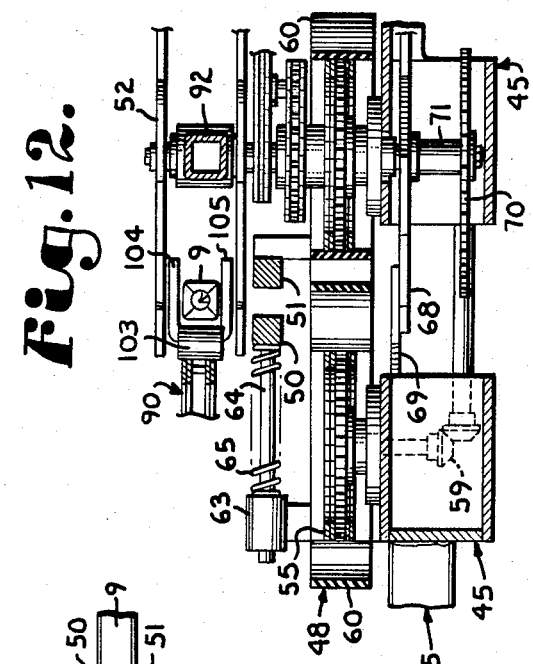
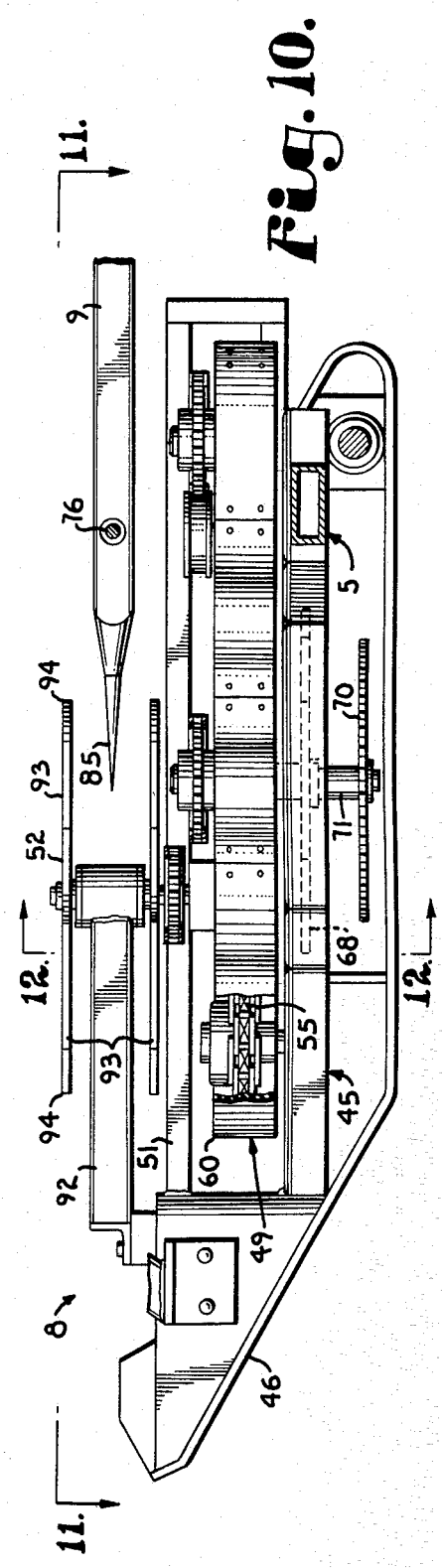

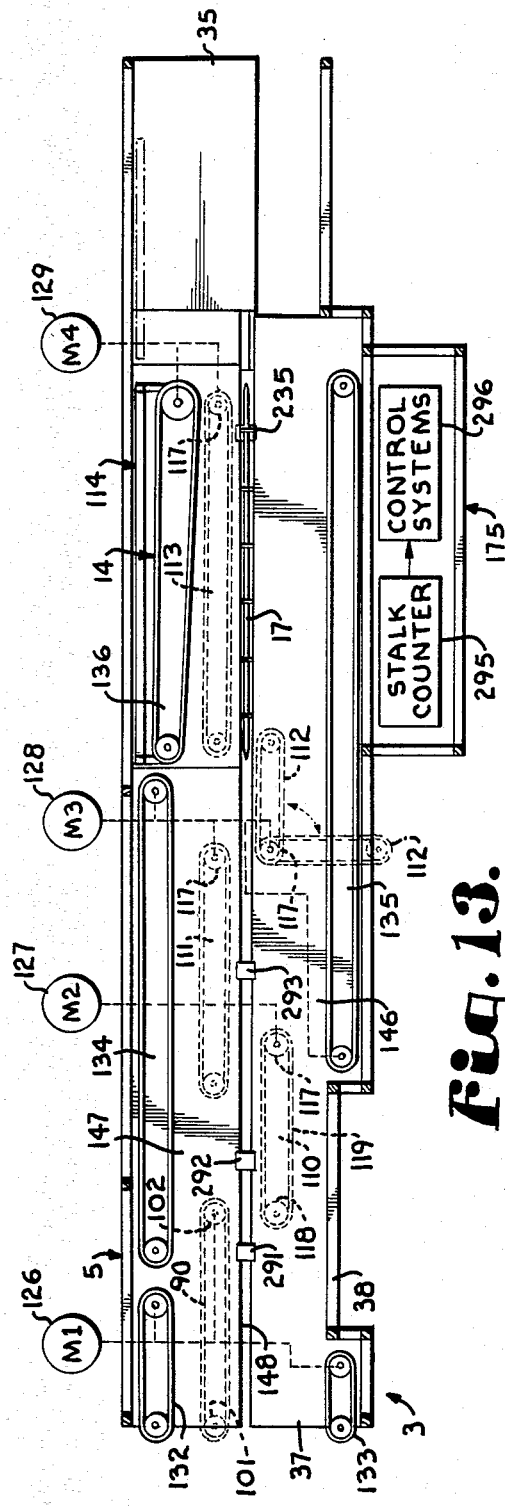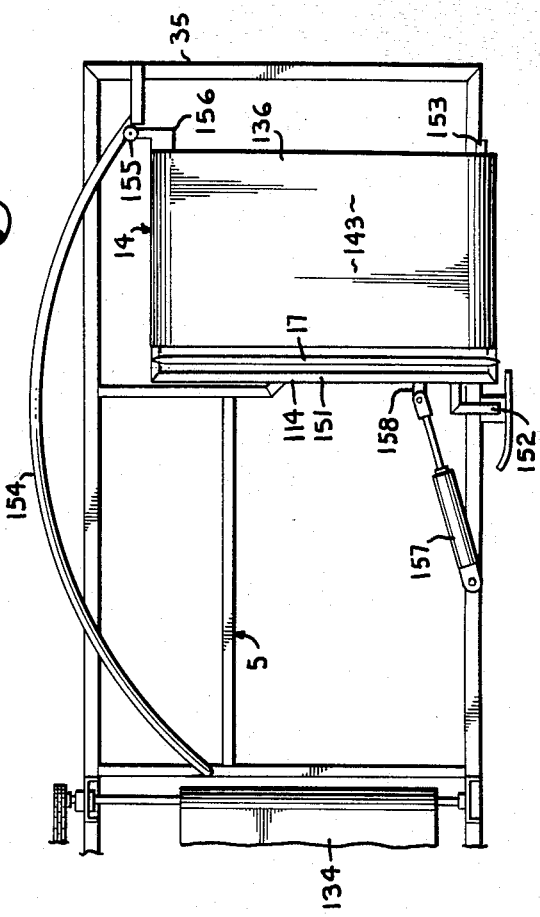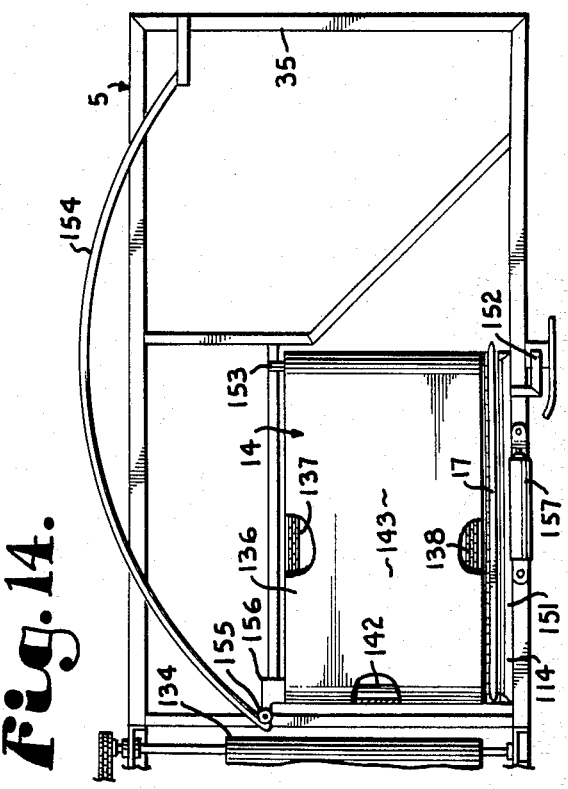

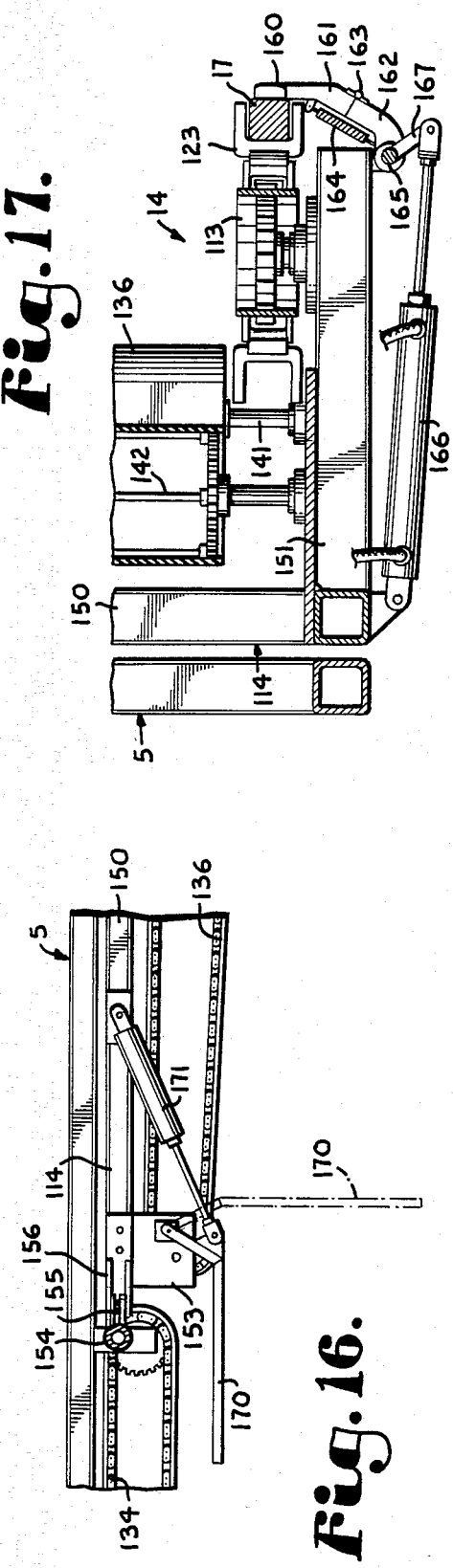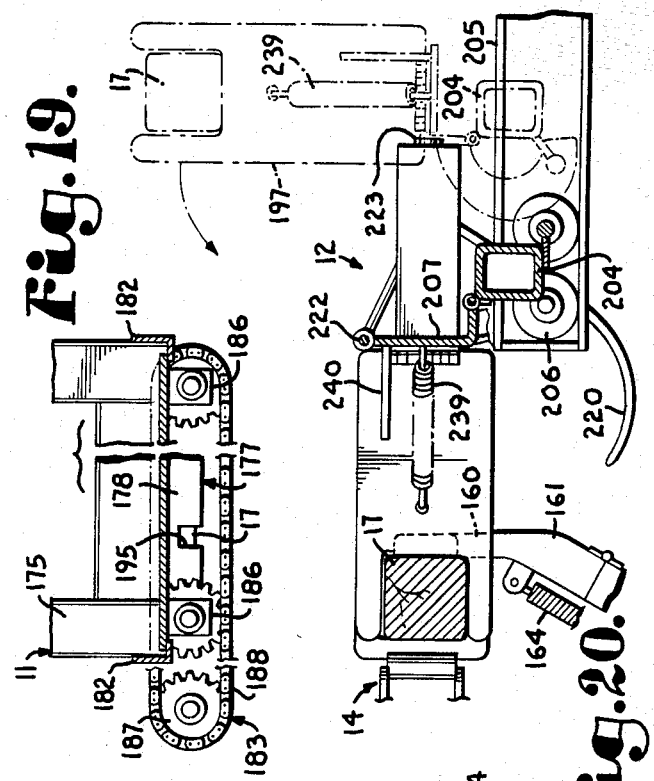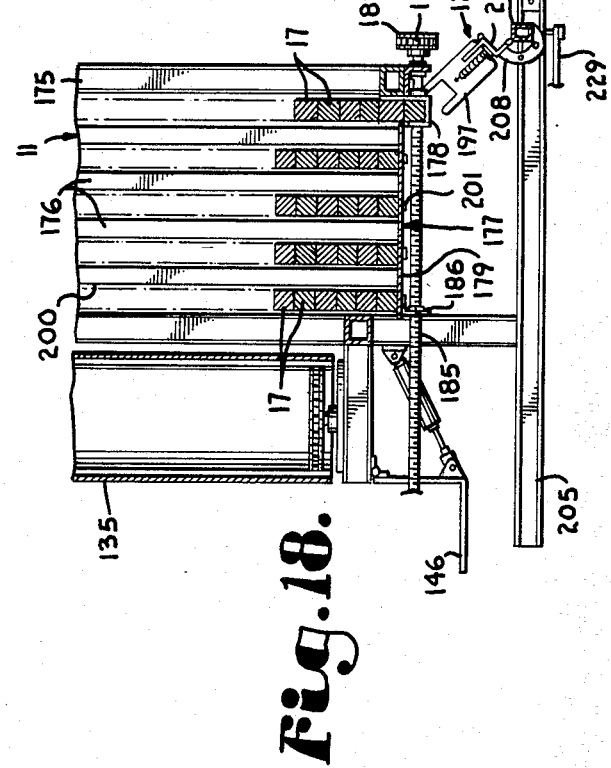

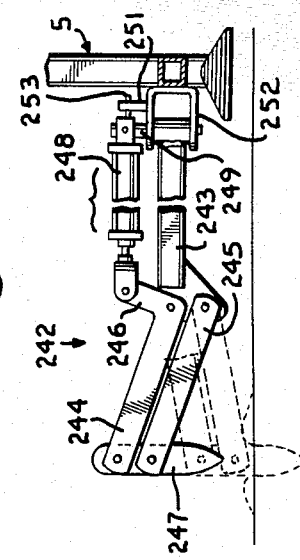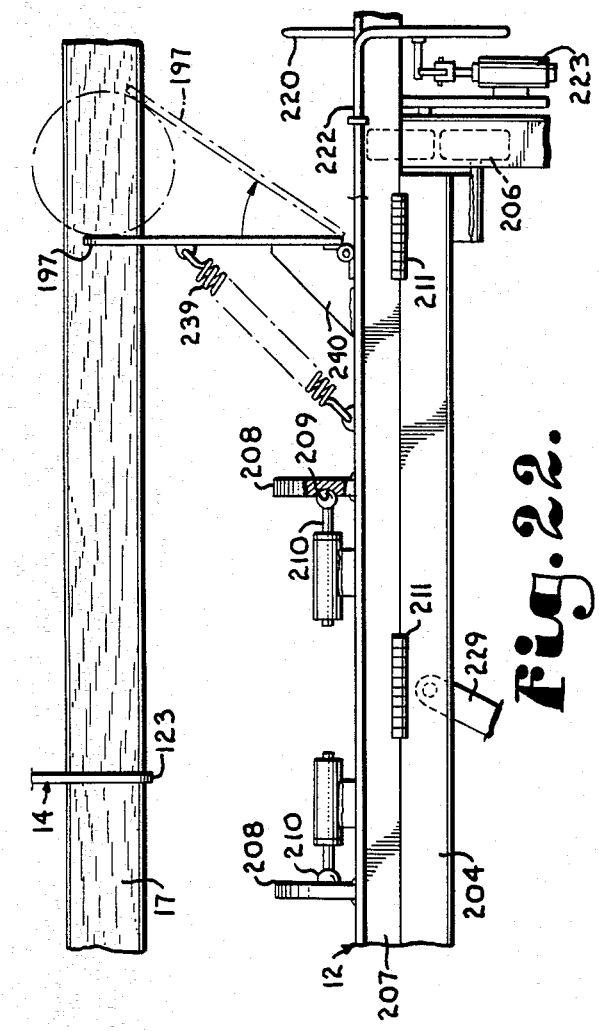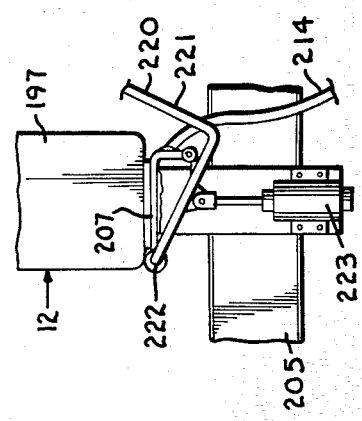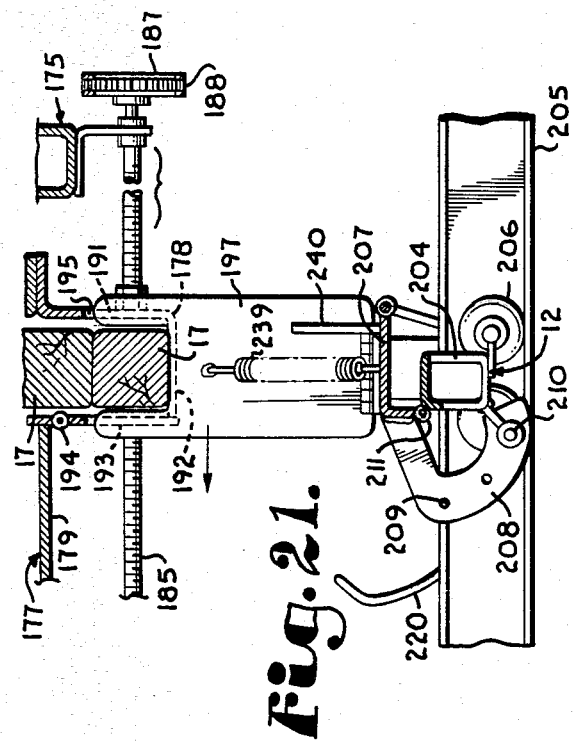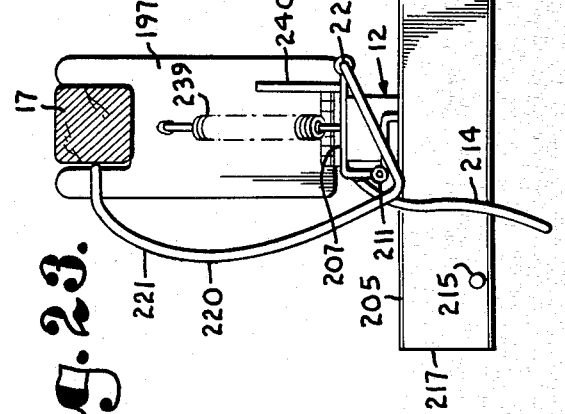

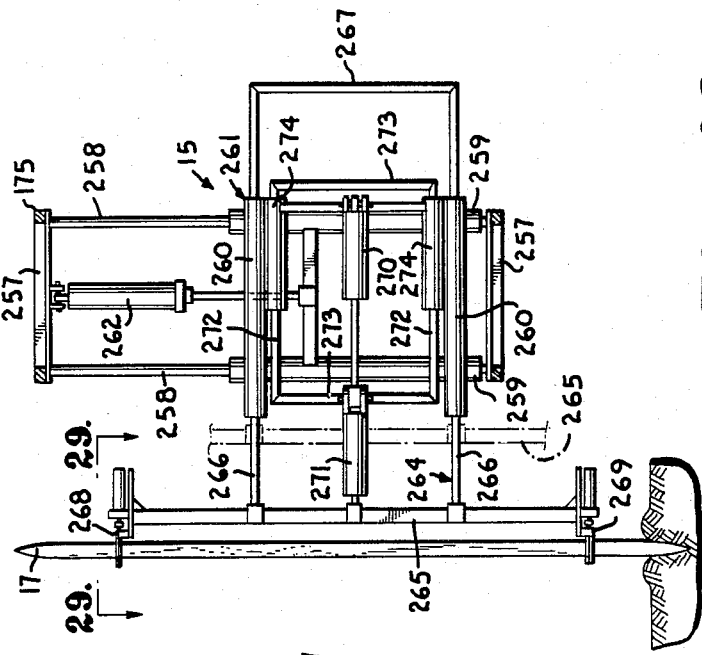
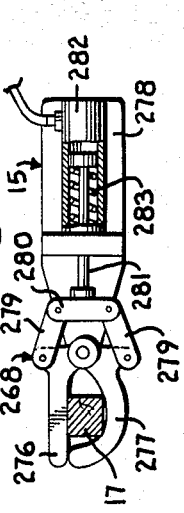
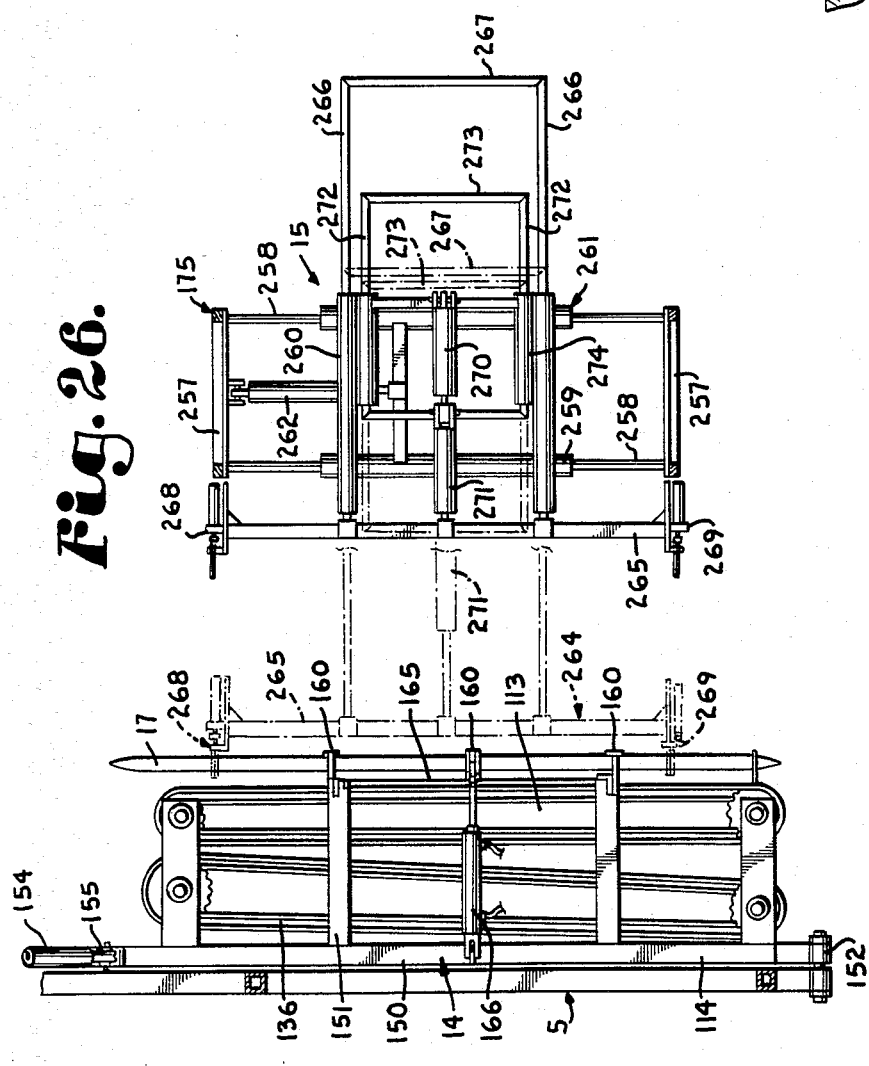
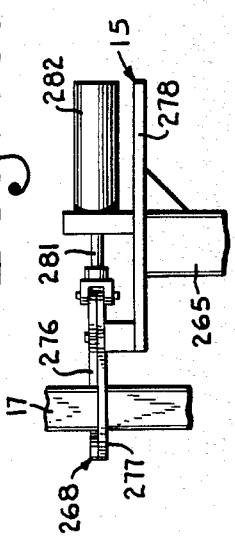

TOBACCO HARVESTER

FIELD OF THE INVENTION

The present invention relates to tobacco harvesting apparatus and, more particularly, to such an apparatus which is self-propelled and which cuts tobacco plants, impales them in spaced relation onto a tobacco stick, and stands the loaded tobacco sticks vertically in the ground for subsequent retrieval.

BACKGROUND OF THE INVENTION

Tobacco is usually harvested for curing the leaves by impaling a group of tobacco plants through the stalks on a pointed tobacco stick and placing the loaded sticks on racks in tobacco curing barns. Manual harvesting of tobacco plants is very laborious. A bundle of pointed tobacco sticks, or spikes are distributed between a pair of tobacco rows. Each plant stalk is cut manually with a knife, hatchet or the like; and the severed stalk is impaled upon a vertically held stick. When about six stalks have been so loaded, the loaded stick is either staked in or laid down on the ground for subsequent gathering and transport to a curing barn.

In order to reduce the amount of manual labor required in tobacco harvesting, machines have been devised for facilitating such operations. In the simplest of such machines, a stick holding device is provided which is loaded manually from time to time from a container holding a supply of such sticks. As the machine proceeds through the field, a cutter device severs the tobacco stalk, and the plant is lifted and manually impaled on the stick. When the required number of stalks have been impaled, the loaded stick is dropped or dumped onto the ground. With such machines, the manual labor involved is only minimally reduced. Further, the dumping of the loaded sticks onto the ground results in damage to the tobacco leaves such that the usable yield is reduced.

More complex tobacco harvesters have been developed wherein each stalk is grasped, cut, and impaled on a tobacco stick mechanically. When the required number of stalks have been impaled, the loaded stick is ejected. One known harvester rotates the plants from vertical to a transverse horizontal position prior to impalement. Such harvesters are successful in reducing the manual labor involved in tobacco harvesting. However, the problem of leaf damage when the loaded stick is ejected is still present. Further, because the stalks are impaled directly onto the tobacco stick, the stick supplying mechanism must be close to the impalement mechanism or, alternatively, the stick must be conveyed into the impalement mechanism, such that such machines are mechanically complex.

Another known tobacco harvester solves the leaf damage and stick feeding problems by providing a rotary arrangement of four radially positioned stick holders. As each stick is loaded, the mechanism rotates an unloaded stick into place. However, the unloaded sticks are manually emplaced in the holders, and the stalk loaded sticks are manually transferred from the holders, presumably, to a vehicle with a stick holding rack thereon which travels along the tobacco rows with the harvesting machine.

SUMMARY OF THE INVENTION

The tobacco harvester according to the present invention overcomes many of the shortcomings of the tobacco harvesting methods heretofore employed by providing a self-propelled tobacco harvesting machine including a stalk cutter, an impalement conveyor to urge the stalk into impaled engagement with a fixed elongated stalk spear, and plant conveyors to slide the stalks in spaced relation along the spear toward a stick loading conveyor. The stick loading conveyor is positioned across from a stick feeder mechanism which transfers sticks one at a time from a multiple stack gravity feed stick magazine to the stick loading conveyor. The stick feeder places the stick in longitudinal alignment with the stalk spear such that the stalks are guided directly off the spear onto the stick. When the required number of stalks have been impaled, the stick loading conveyor pivots upwardly and rearwardly about a transverse axis, and a stick setter removes the stalk loaded stick from the stick loading conveyor and places the stick into a hole which has been previously formed by a hole punching mechanism of the harvester.

The harvester of the present invention is externally and internally faired; and, additionally, vertically oriented wide belt conveyors are provided on both sides of the stalk path which move at the same rate that the plants are conveyed along the stalk spear to support the plants to some degree during conveyance, such that frictional and abrasive damage to the leaves is minimized. The vertical standing of the loaded sticks as they exit the harvester further reduces leaf damage as compared with harvesting machines which merely eject the loaded sticks onto the ground.

OBJECTS OF THE INVENTION

The principal objects of the present invention are: to provide an improved apparatus for harvesting tobacco plants; to provide such a harvester which minimizes the manual labor required in such harvesting; to provide such an apparatus which minimizes damage to the leaves of tobacco plants during harvesting; to provide such a harvester which severs the stalk of a tobacco plant, positions a plurality of the plants on a tobacco stick by impaling the stalks onto a stick, and places the stalk loaded stick vertically in the ground for subsequent retrieval and placement on racks in curing barns; to provide such a harvester which is self-propelled; to provide such a harvester having suitable characteristics for traveling on roads for transportation between sites of use; to provide such a harvester wherein the operating mechanisms can be adjusted in height for operation on varying terrains; to provide such a harvester which can be operated substantially by a single worker; to provide such a harvester which is equipped for harvesting two rows of tobacco plants at a time; to provide such a harvester capable of a high rate of harvesting; to provide such a harvester which can be maintained with relative ease; and to provide such a tobacco harvester which is economical to manufacture, efficient and durable in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is an enlarged fragmentary plan view illustrating details of the operating components of the front end and middle portions of the tobacco harvester.

FIG. 5 is a greatly enlarged transverse sectional view through a tobacco plant stalk impaling spear of the harvester and illustrates details of one of the pneumatic spear holders.

FIG. 6 is a fragmentary plan view at a reduced scale and illustrates a modified mechanism for impaling a tobacco stalk onto the tobacco stalk spear.

FIG. 7 is a view similar to FIG. 4, is a continuation of FIG. 4, and illustrates details of the rear operating components of the tobacco harvester.

FIG. 8 is a view similar to FIG. 6 and illustrates the clearance relationship between small finger members of certain stalk conveyors and large finger members of other stalk conveyors of the harvester.

FIG. 9 is a greatly enlarged fragmentary side elevational view showing the positioning of a pointed end of a tobacco stick in a cooperating socket at the rear end of the stalk spear.

FIG. 10 is an enlarged longitudinal sectional view taken along line 10—10 of FIG. 4 and illustrates details of the cutter and impaler head of the harvester.

FIG. 11 is an enlarged fragmentary top plan view taken along line 11—11 of FIG. 10 with portions broken away to illustrate details of the drive mechanism for the cutter and impaler head of the harvester.

FIG. 12 is a fragmentary transverse sectional view taken along line 12—12 of FIG. 10 and illustrating further details of the drive mechanism of the cutter and impaler head.

FIG. 13 is a diagramatic plan view of one of the harvester units of the tobacco harvester according to the present invention and illustrates the arrangement of the stalk conveyor and the control thereof.

FIG. 14 is a fragmentary longitudinal sectional view of one of the harvester units and illustrates the stick pivoter thereof in a normal position.

FIG. 15 is a view similar to FIG. 14 and illustrates the stick pivoter in a pivoted position which orients a plant loaded tobacco stick vertically.

FIG. 16 is a fragmentary top plan view and illustrates a plant stabilizer arm which is associated with the stick pivoting mechanism.

FIG. 17 is a fragmentary transverse sectional view through the stick pivoter mechanism and illustrates details of a clamp finger mechanism which retains a stick pivoter mechanism during the pivoting thereof.

FIG. 18 is a fragmentary transverse sectional view through the stick magazine and illustrates details of stick singulator and the relationship of the stick positioner thereto.

FIG. 19 is a fragmentary side elevational and illustrates details of a motor for moving the stick singulator mechanism between the vertical stacks within the stick magazine.

FIG. 20 is an enlarged fragmentary transverse cross sectional view and in full lines illustrates details of the stick positioner mechanism just prior to retraction thereof for pivoting of the stick and in phantom lines illustrates the stick position just prior to placing a stick on the stick pivoter.

FIG. 21 is an enlarged fragmentary transverse sectional view of a stick positioner which is shown just prior to removing a tobacco stick from a stick magazine.

FIG. 22 is an enlarged fragmentary top plan view of the stick positioner shown in its normal position adjacent the stick pivoter mechanism.

FIG. 23 is a view similar to FIG. 21 and illustrates an intermediate position of the stick positioner mechanism and further illustrates a lever and lug for causing rotation of the stick positioner carriage.

FIG. 24 is a view similar to FIG. 18 except from an opposite end of the stick positioner and illustrates an actuating cylinder for a bale member which retains a tobacco stick on the rotatable stick positioner carriage.

FIG. 25 is a fragmentary transverse sectional view at a reduced scale and illustrates details of a hole puncher mechanism.

FIG. 26 is a fragmentary transverse sectional view illustrating details of a stick setter mechanism and its relationship to the stick pivoter mechanism which is shown in a pivoted position.

FIG. 27 is a view similar to FIG. 26 and illustrates the relationship of the parts thereof in a lowered and partially extended stick setting position.

FIG. 28 is an enlarged elevational view illustrating details of one of the gripping hands of the stick setter mechansim.

FIG. 29 is an enlarged fragmentary plan view taken on line 29—29 of FIG. 27 and illustrates further details of one of the stick gripping hands of the stick setter mechanism.

DETAILED DESCRIPTION OF THE PREFERRED EMBODIMENTS

Figure 2:
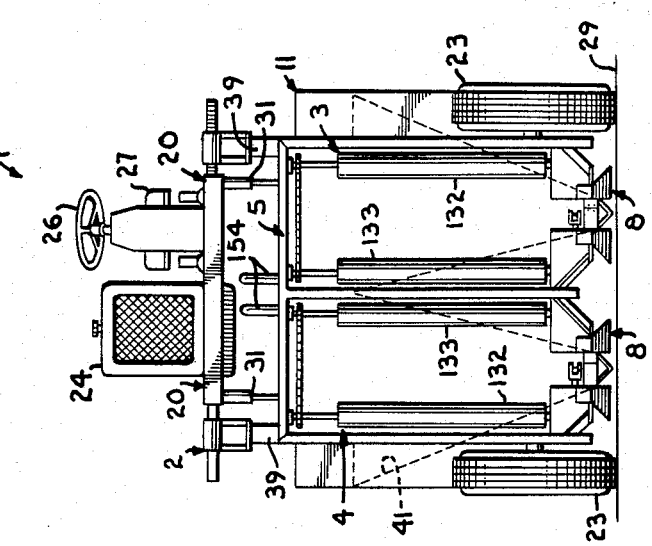
FIG. 2 is a front elevational view of the tobacco harvester according to the present invention.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
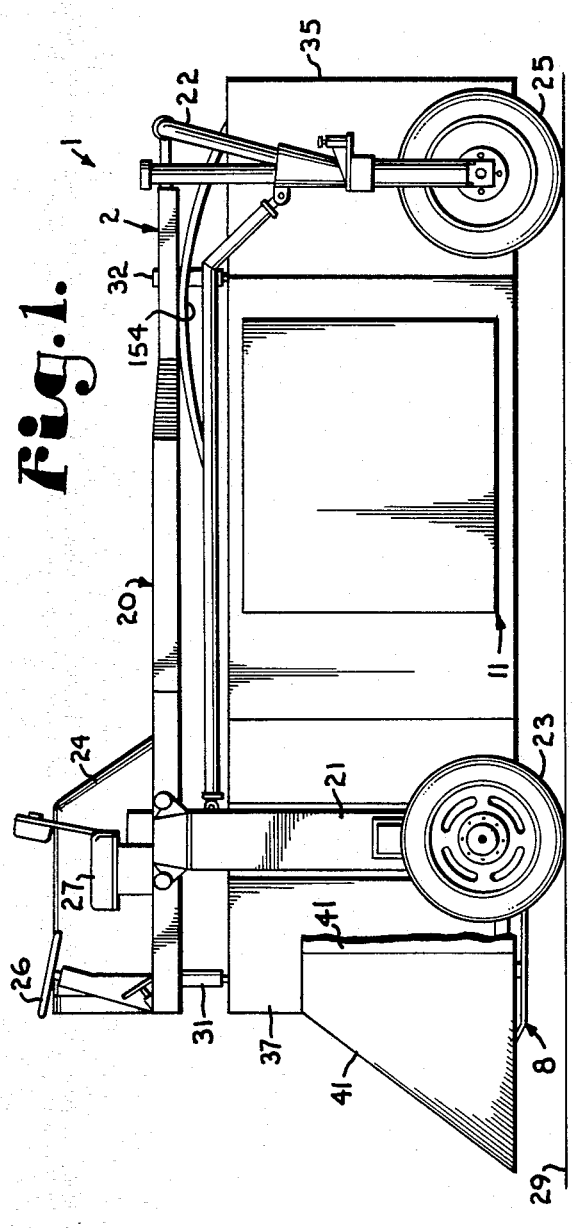
FIG. 1 is a side elevational view of a tobacco harvester embodying the present invention.
Figure 3:
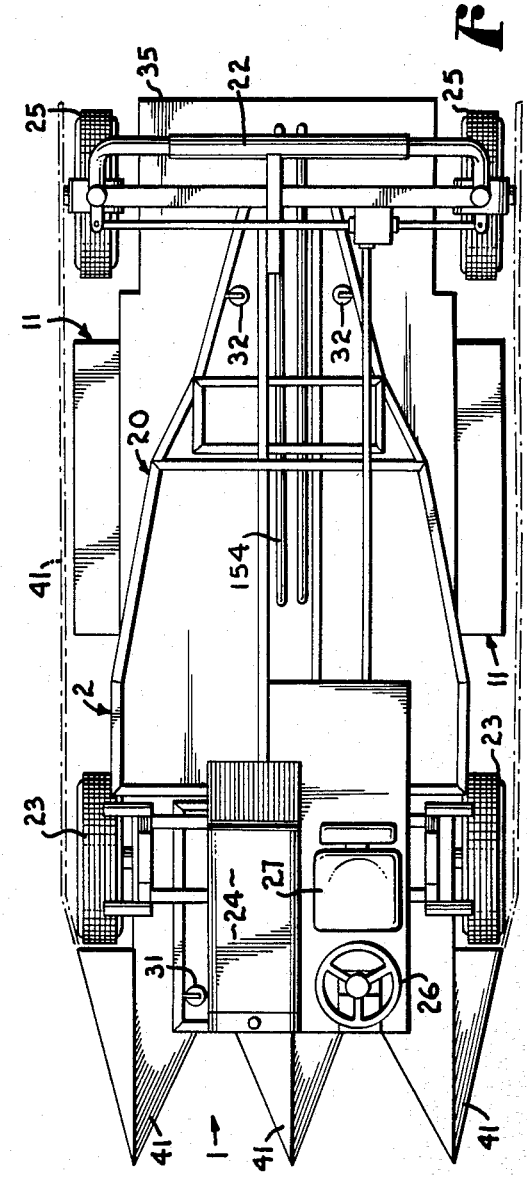
FIG. 3 is a top plan view of the tobacco harvester.

Referring to the drawings in more detail:

The reference numeral 1 generally designates a tobacco harvester according to the present invention. Referring to FIGS. 1 through 3, the harvester 1 generally includes a self-propelled vehicle frame 2 having one or more harvester units 3 and 4 connected thereto. Each of the harvester units 3 and 4 is a major subassembly and includes a harvester unit subframe 5 upon which the tobacco harvesting components are mounted. Referring to FIGS. 4 and 5, the tobacco harvesting components generally include a stalk cutter head 8, a stalk impaler 9, a stalk conveyor 10, a tobacco stick magazine 11, a tobacco stick positioner 12, a tobacco stick pivoter 14, and a tobacco stick setter 15. In general, the harvester 1 is driven through a pair of rows of tobacco plants in a field and the tobacco harvesting components cooperate to cut the tobacco plants, impale the plants through the stalks thereof, load a plurality of the plants in impaled relation on a horizontally oriented tobacco stick 17, pivot the plant loaded stick 17 to a vertical orientation, and set the vertically oriented stick penetratingly into the ground.

The illustrated vehicle frame 2 includes a raised platform 20 having front and rear U-shaped wheel frames 21 and 22 connected thereto. In the illustrated harvester 1, the front wheels 23 are drivingly connected to a vehicle motor 24 for propulsion of the harvester 1. The rear wheels 25 are rotatably mounted on the rear wheel frame 22 and operatively connected to a steering wheel 26 for steering the harvester 1. The motor 24, steering wheel 26, and a driver's seat 27 are mounted on the upper platform 20.

The illustrated platform 20 is positioned approximately seven feet above the ground surface 29. The harvester units 3 and 4 are positioned between the legs of the front and rear wheel frames 21 and 22 and are connected to the upper platform 20. Preferably, a means is provided for adjusting the vertical position of the harvester units 3 and 4 relative to the ground surface 29; and in the illustrated harvester 1, the harvester units are connected to the platform 20 by means of front and rear hydraulic cylinder pairs 31 and 32 positioned at the front and rear ends 37 and 35 respectively. In addition, guide means may be needed for maintaining proper alignment of the harvester units 3 and 4 with the vehicle frame 2. At the front end 37 of the harvester, the harvester unit subframes are indented at 38 (FIG. 1) to clear the inner surfaces of the legs 39 of the front wheel frame 21. The provision of the cylinders 31 and 32 along with associated guide means allows raising of the harvester units 3 and 4, as illustrated in FIG. 1, for extra ground clearance during the transportation of the harvester 1 on roads and somewhat irregular terrain in addition to lowering of the harvester units 3 and 4, as illustrated in FIG. 2, for harvesting operations.

The harvester units 3 and 4 are preferably mirror images in configuration to allow placement of each of the tobacco stick magazines 11 externally or outboard of the harvester 1 to facilitate replenishing of tobacco sticks 17 therein. The harvester units are positioned in side-by-side relation on the vehicle frame 2 and may be either totally independent subassemblies with separate interconnected subframes 5 or may be built on a single subframe 5 with shared frame components. As shown in FIGS. 1 through 3, the harvester 1 is provided with fairings 41 to minimize damage to standing tobacco plants upon engagement thereof by the harvester 1.

Referring to FIG. 4 and FIGS. 10 through 12, the cutter head 8 includes a cutter head frame 45 which is connected to the harvester subframe 5 and upon which the operative components of the cutter head are mounted. A pair of guide shoes 46 extend forwardly from the frame 45 and define a converging guide mouth 47 to guide the stalks of tobacco plants into the harvester units 3 and 4 of the harvester 1. During the cutting and impaling of tobacco stalks, the stalks are preferably supported at multiple positions in order to prevent the tobacco plants from falling over and being damaged. At the lowest level, the stalks are supported by opposed, cooperating stalk gripper conveyors 48 and 49. Immediately thereabove, the stalks are clamped by guide rails 50 and 51. During the impalement of stalks onto the spear 9, the stalks are urged thereinto by an impaler mechanism such as the illustrated star wheel 52. The stalk gripper conveyors 48 and 49 are substantially mirror images of one another and include endless support and driving chains 55 trained about idler sprockets 56 and drive sprockets 57. One of the drive sprockets 57 is operatively connected to a drive motor as will be explained herein below, and the drive sprockets 57 are interconnected by beveled gear sets 59, one of which is shown in phantom in FIG. 12. Each of the chains 55 has a resilient lobed belt 60 thereon which in straight runs of the conveyors 48 and 49 forms projecting lobes which intermesh between the conveyors 48 and 49 to grip a stalk therebetween. The belts 60 may run continuously about the conveyors 48 and 49 or may be formed in short sections. Preferably, the belts 60 are formed of a material such as rubber impregnated fabric.

In the illustrated harvester 1, the guide rail 50 is resiliently urged toward the rail 51 which is rigidly mounted on the cutter head frame 45. The movable rail 50 is mounted on guide sleeves 63 which are pivotally connected to the cutter frame 45, and rods 64 extend from the rail 50 and are received in the sleeves 63. Springs 65 are sleeved over the rods 64 and urge the rail 50 toward the fixed rail 51.

The stalks are severed by means of a rotary stalk cutting blade 68 which is rotatably mounted on the cutter head frame 45. The illustrated blade 68 is a plurality of blades having linear cutting edges which cooperate with a cutting edge of a fixed blade 69 to shear the stalks in spaced relation to the ground surface 29. Alternatively, the stalk cutter blade could be a single rotary blade of a rotary saw type configuration. Further, other types of stalk cutting arrangements are envisioned for use within the harvester 1. In addition to the principal stalk cutting blade 68, each of the harvester units 3 and 4 is preferably provided with a stalk stub trimming blade 70 which is operative to trim the remaining stub after the stalk is cut in order to prevent interference between the stub and portions of the harvester units 3 and 4. The stub trimmer blade 70 is illustrated as a rotary saw type blade which is positioned on a common blade shaft 71 with the main cutting blade 68.

The stalk impaling spear 9 is horizontally oriented and is positioned longitudinally of the subframe 5 of each harvester unit 3 and 4. Since the stalks must be slid the entire length of the spear 9, the spear must be intermittently supported. Some vertical and lateral support for the spear is provided by fingers of the stalk conveyors 10. In order to prevent longitudinal movement of the spear 9, a plurality of spear supporting pneumatic cylinders are positioned along the spear 9. With reference to FIG. 5, each cylinder 75 includes a plunger 76 which extends through a plunger support sleeve 77. The cylinders 75 may be supported either by direct connection to the subframe 5 or by connection of the sleeve 77 to the subframe 5. The plunger 76 of each cylinder 75 cooperates with a notch, detent, or aperture 78 formed in the side surface of the spear 9. The illustrated spear 9 has apertures 78 formed therein and includes a plunger receiving sleeve 79 mounted in the aperture. Each cylinder 75 is associated with a stalk sensor 80 which includes a stalk engagement arm 81 positioned in longitudinally spaced relation to the associated cylinder 75. The sensor 80 is connected with a valve (not shown) which controls the operation of the associated cylinder 75. Upon the engagement of a stalk on the spear 9 with a sensor arm 81, the arm is rotated which causes the retraction of the plunger of the associated sensor to allow passage of the stalk thereby. When the stalk has been conveyed past the plunger 76, the sensor arm 81 is disengaged from the stalk and returns to its original position thereby causing the extension of the plunger 76 into the sleeve 79 associated therewith. The stalk impaling spear 9 may have any suitable cross section and is illustrated as a square cross section, tubular metal rod. The spear 9 has a pointed front end 85 and a tobacco stick end receiving socket 86 at a rear end thereof (see FIGS. 7 and 9).

The stalks are impaled onto the spear 9 by cooperation of the rotary star wheel 52 and an impalement conveyor 90. The star wheel 52 is rotatably mounted on an arm 92 extending from the cutter head frame 45 and includes upper and lower sets of radial arms 93 having arcuate ends 94. The upper and lower arms 93 are positioned above and below the spear 9. FIG. 6 illustrates a modified embodiment of the impaler mechanism including an impaler arm 95 pivotally mounted above the stalk gripping conveyor 48 on the cutter head frame 45. A pneumatic cylinder 96 is pivotally connected to the subframe 5 and has the ram end thereof connected to the arm 95. A stalk sensor 97 is pivotally mounted on the frame 45 and extends across toward the conveyor 49 and in front of the point 85 of the spear 9. Upon the engagement of a stalk with the sensor 97, the cylinder 96 extends thereby pivoting the arm 95 to urge the stalk onto the spear 9. The impalement conveyor 90 includes an endless chain 100 trained about a pair of sprockets 101 and 102. The chain 100 has outwardy extending finger members 103 having upper and lower fingers 104 and 105 which are positioned above and below the stalk impaling spear 9.

The stalks are conveyed from the cutter head 8 to the stick 17 on the stick pivoter 14 by the stalk conveyor 10 which includes conveyors 110 and 111 (FIG. 4) and conveyors 112 and 113 (FIG. 7). The conveyors 110, 111 and 112 are mounted on the harvester subframe 5 while the conveyor 113 is mounted on a stick pivoter frame 114 which is pivotally connected to the harvester subframe 5. Referring to FIGS. 4, 7, and 13, the conveyor 90 and the conveyors 110 through 113 are positioned on alternating sides of the tobacco spear 9 from the front end 37 to the rear end 35 of the harvester 1. Each of the conveyors laterally overlaps the next conveyor, and by this means movement of stalks on the spear 9 is transferred from conveyor to conveyor from the cutting head 8 to the stick pivoter 14. Each of the conveyors 110 through 113 is substantially similar to the impaling conveyor 90 and has an endless chain type of conveyor driven by sprockets turning on vertical axes. Each conveyor includes a drive sprocket 117, an idler sprocket 118, and an endless roller chain 119 trained about the sprockets 117 and 118. The conveyors 110, 111, 112, and 113 have respective finger members 120, 121, 122, and 123 on the chains 119 thereof for engagement with tobacco stalks to convey same along the spear 9. The drive sprocket 102 of the impaling conveyor 90 is connected to a first rotary hydraulic motor 126 (FIG. 13), and the drive sprocket 117 of the conveyor 110 is connected to a second rotary hydraulic motor 127. The drive sprockets 117 of the conveyors 111 and 112 are connected to a third rotary hydraulic motor 128, and the drive sprocket of the conveyor 113 is connected to a fourth rotary hydraulic motor 129. Preferably, the motors 126, 127 and 128 are mounted near the top of the harvester subframe 5 and connect with the respective conveyors by means of conventional sprockets, chains, and shafts. The fourth motor 129 is mounted on the stick pivoter frame 114 and is connected to the sprocket 117 in a similar manner.

In order to minimize frictional and abrasive damage to the leaves of tobacco plants from contact with the internal surfaces of the units during movement therethrough, each of the harvester units 3 and 4 is provided with upstanding wide belt conveyors or canvas conveyors 132, 133, 134, 135 and 136. Each of the canvas conveyors 132 through 136 includes an upper chain 137 and a lower chain 138 which are trained about longitudinally spaced sprocket sets including a drive sprocket set 139 and an idler sprocket set 140. Each sprocket set includes an upper sprocket and a lower sprocket interconnected by a respective drive shaft 141 or an idler shaft 142. Each of the conveyors 132 through 136 includes a wide or tall flexible belt 143 extending between the upper chain 137 and the lower chain 138. The belts 143 are preferably made of canvas or rubber impregnated canvas. The conveyors 132 through 136 have a height of about three or four feet for contact with a substantial portion of the leaves of the tobacco plants. The conveyors 132 and 133 are connected to the first rotary hydraulic motor 126 and operate at a linear or conveyor speed which is substantially the same as the conveyor speed of the impalement conveyor 90. The conveyors 134 and 135 are connected to the third hydraulic motor 128, and the conveyor 136 is connected to the fourth hydraulic motor 129. In general, the canvas conveyors 132 through 136 operate at substantially the same linear speed as the stalk conveyors to which they are adjacent in order to move the upper portions of the tobacco plants at the same speed as the stalks. The canvas conveyors extend along substantially the entire surfaces of the harvester units except in the area of the frame indentation 38 near the front end 37 of the harvester. As illustrated in FIG. 4, the internal surface of the members forming the indentation 38 are covered by a smoothly surfaced friction plate 144.

The conveyors 90 and 110 through 113 are positioned in laterally overlapping relation to pass stalks on the spear 9 from one conveyor to the next. Since the stalks on the spear 9 are engaged by finger members of the conveyors, a means is required to prevent mutual interference between the finger members of overlapping conveyors. As is illustrated in FIG. 8, the conveyors 90, 111, and 113 have upper and lower fingers on the respective finger members 103, 121, and 123 thereof which are spaced relatively closely to the upper and lower surfaces of the tobacco spear 9. The remaining conveyors 110 and 111 have upper and lower fingers on the respective finger members 120 and 122 thereof which are spaced far enough apart to allow the fingers of a laterally overlapping conveyor to pass therebetween. Referring to FIGS. 4 and 7 and referenced to the front end 37 of the illustrated harvester unit 23, the conveyors 90, 111 and 113 are positioned on the right side of the spear 9 while the conveyors 110 and 112 are positioned on the left side thereof. Thus, the closely spaced fingers 103 pass between the relatively widely spaced finger members 120 of the conveyor 110; the fingers 120 of the conveyor 110 pass above and below the finger members 121 of the conveyor 111; and so forth. In order to prevent the entanglement of separated leaves and other parts of the tobacco plants with the mechanisms of the conveyors 90 and 110 through 113, each of the harvester units 3 and 4 is provided with floor plates 146 and 147 (FIG. 13). The floor plates 146 and 147 extend from the sides of each subframe 5 toward the spear 9 and define a stalk conveyor path 148 between the inward edges thereof. The floor plates 146 and 147 have been omitted from FIGS. 4 and 7 in order to better illustrate the operating mechanisms on the harvester unit 3.

The stick pivoter 14 may be any structure operative to pivot the tobacco stick 17 from its horizontal loading position to a vertical position for setting in the ground. As is illustrated in FIGS. 7, 14, 15, 17, and 26, the stick pivoter frame 114 is substantially L-shaped in lateral cross section and includes a side frame 150 and a lower frame 151. The stick pivoter frame 114 is pivotally connected to the harvester subframe 5 by means of a pivot joint 152 located at the lower rear end of the frame 114. The stick pivoter 14 has the conveyor 113 and a lower side of a canvas conveyor 136 connected to the lower frame 151. The upper side of the conveyor 136 is connected to upper extensions of the side frame 150. A large circular stick pivoter guide 154 is attached to the subframe 5 and extends over approximately the rear half of the subframe 5. A roller 155 is mounted on an extension 156 from the forward upper surface of the side frame 150 and engages the guide 154 during the pivoting of the frame 114. The pivoter frame 114 is pivoted by means of a hydraulic cylinder 157 connected between the subframe 5 and a short depending lever arm 158 extending from the lower portion 151 of the pivoter frame 114. Preferably, the pivot joint 152, cylinder 157, roller 155, and guide 154 are substantially in a single plane such that there are no twisting moments applied to the pivoter frame 114 during the pivoting thereof.

The fourth hydraulic motor 129 is mounted on the pivoter frame 114 and is operatively connected to the conveyors 113 and 136 to drive same. The conveyor 113 receives the stalks from the conveyor 112 and the fingers 123 of the conveyor 113 slide the stalks along the tobacco stick 17 in spaced relation. During the loading of stalks onto the sticks 17, the stick is supported by cooperation of the stick loading conveyor 113 and the stick positioner 12. When the required number of stalks have been loaded onto the stick 17, the stick positioner 12 is retracted away from the stick pivoter to provide clearance during the pivoting thereof. In order to retain the stick on the conveyor 113, the stick pivoter 14 is provided with clamp fingers 160 (FIG. 17) which resiliently retain the stick 17 on the conveyor 113. As illustrated, the fingers 160 include an outer portion 161 and an inner portion 162 connected by a hinge 163. A spring 164 extends between and is connected to the inner and outer portions 162 and 161 of the fingers 160. In the illustrated harvester, three such clamp fingers 160 are provided and are interconnected on a common shaft 165 which is rotatably connected to the lower frame 151 of the pivoter frame 114. An air cylinder 166 connects between the frame 151 and a crank arm 167 extending from the shaft 165. Upon extension of the cylinder 166, the fingers 160 are rotated into clamping engagement with the tobacco stick 17. This occurs just prior to the retraction of the stick positioner 12 away from the stick pivoter 14. After the frame 114 has been pivoted such that the stick 17 is vertical, the stick may be removed from the conveyor 113 by action of the stick setter 15 pulling the stick 17 away from the conveyor 113 against the tension of the springs 164. The tension of the springs 164 is sufficient to retain the stick 17 on the conveyor 113 but not enough to significantly resist the action of the stick setter 15. After the stick has been removed from the stick pivoter 14, the clamp fingers 160 may be stowed by the retraction of the cylinder 166 to allow an unloaded stick 17 to be positioned on the conveyor 113 by the stick positioner 12 after the pivoter frame 114 has been returned to its normal position.

Referring to FIG. 16, the stick pivoter 14 is provided with a plant stabilizer arm 170 which is deployed prior to the pivoting of the frame 114 to ensure that the plants which have been loaded onto the stick 17 are standing vertically to avoid damage to the forwardmost plants which might otherwise be damaged by contact with the harvester subframe 5 during the pivoting of the frame 114. The illustrated plant stabilizer arm 170 is pivotally connected to the front frame extension 153 and is operated by an air cylinder 171 connected between the side frame 150 and the arm 170. FIG. 16 illustrates the arm 170 in a longitudinally oriented stowed position in full lines and in a laterally oriented deployed position in phantom. The arm 170 is moved to the lateral position to stabilize the tobacco plants just prior to the pivoting of the plant loaded stick and remains in that position until after the stick pivoter frame 114 is returned to its original position.

Tobacco sticks 17 may be positioned on the stick pivoter 14 for loading tobacco plants thereon by any suitable means including manual positioning. FIGS. 7, 18, and 20 through 24 illustrate a preferred stick positioning mechanism 12 which cooperates with a stick magazine mechanism 11 to automatically position tobacco sticks 17 on the stick pivoter 14. The stick magazine 11 includes a stick magazine frame 175 positioned across the harvester subframe 5 from the stick pivoter 14. The frame 175 may be more or less integral with the subframe 5 and includes longitudinal partitions 176 which form a plurality of spaces for vertical stacks of tobacco sticks 17. The magazine 11 is a gravity feed magazine, and the sticks are retained in the spaces between the partitions 176 by a stick singulator 177 which includes a stick feed trough 178 and a stick retainer plate 179 which extending from the trough 178 in a direction toward the stick pivoter 14.

Referring to FIG. 19, the stick singulator 177 is slidably mounted on the magazine frame 175 by reception of front and rear edges of the singulator in singulator tracks 182 positioned at the front and rear ends of the magazine frame 175 at a lower end thereof. The tracks 182 may be formed by depending angle brackets attached to the magazine frame 175. The singulator 177 is moved along the lower end of the magazine frame 175 to position the trough 178 sequentially under the vertical stacks of sticks 17 by a trough motor means 183. The illustrated trough motor means 183 includes a trough motor 184 (FIG. 7), which is operatively connected to a pair of jackscrews 185 which are rotatably mounted on the magazine frame 175 and which are threadedly engaged with nuts 186 mounted on the singulator 177. The motor 184 may be drivingly connected to the jackscrews 185 by any means such as the illustrated sprockets 187 and chains 188. Upon rotation of the motor 184, the singulator 177 is moved laterally of the harvester subframe 5 to selectively position the trough 178 underneath the vertical stacks of tobacco sticks.

The trough 178 has an outside wall 191, a lower wall 192, and a stick door 193 covering a stick opening on a side of the trough which faces the stick pivoter 14. The door 193 is hinged at the top and is biased toward closing by a spring 194. The outside and lower walls 191 and 192 and door 193 have slots 195 therein which align with fingers 197 on the stick positioner 12. During removal of the stick from the trough, the stick positioner grasps the stick therein and pushes it against the door 193 and through the opening out of the trough 178. The door snaps back into place, and the next stick in the magazine stack descends into the trough.

The magazine 11 includes an empty sensor to detect the depletion of a stack of sticks. The empty sensor controls the trough motor 184 to move the trough to the next stack. A sensor switch 199 is positioned in each stack aisle 200 to sense the presence of the lowest stick. As the last stick of a stack is removed it disengages from the empty sensor switch 199, and a stack empty signal activates the trough motor 184 to move the trough to the next stack. A trough position sensor includes a position switch 201 at each stack which is engaged by the trough 178 as it moves into position under that stack. Operation of a trough position switch 201 deactivates the trough motor 184, and the stick singulator 177 stops.

The stick positioner 12 includes a shuttle 204 mounted on parallel tracks 205 extending from a position spaced across from the stick pivoter 14 to an external side of the stick magazine 11. The shuttle 204 includes wheels or rollers 206 which ride on surfaces of the tracks. A stick carriage 207 is hingedly connected to the shuttle 204 and has the stick gripping fingers 197 hingedly connected thereto. The stick positioner 12 includes a detent arrangement such that the carriage 207 assumes selected positions with respect to the shuttle 204. A pair of sectors 208 extend from the carriage 207 and have circumferentially spaced apertures or dimples 209 therein. A spring loaded detent follower 210 is mounted on the shuttle 204 and is resiliently urged toward the apertures 209. The apertures 209 are spaced radially from a hinge member 211 which connects the carriage 207 to the shuttle 204 such that rotation of the carriage 207 about the hinge 211 moves the apertures 209 into engagement with the detent follower 210. The carriage 207 is pivoted to its respective positions by engagement of a lever arm 214 with lugs extending from the track members 205. The carriage 207 includes a pair of carriage rotating levers 214 extending therefrom. The track members 205 include inner lugs 215 and outer lugs 216 positioned respectively at inner ends 217 and outer ends 218 of the tracks 205. The inner end 217 is adjacent and across from the stick pivoter 14 while the outer end 218 is adjacent to an outer side of the harvester 1. Upon the engagement of the levers 214 with the lugs 215 as the stick positioner 12 approaches the stick pivoter 14, the carriage 207 is rotated to a stick placing position (See FIG. 20). Upon the engagement of the levers 214 with the outer lugs 216 as the stick positioner 12 is retracted to receive a stick from the magazine 11, the carriage 207 is rotated to an upwardly inclined orientation for engagement with a stick 17 in the trough 178 (See FIG. 18).

As the stick positioner 12 is moved toward the stick pivoter 14, engagement of the stick positioner fingers 197 with a stick 17 in the trough 178 through the slots 195 therein causes the carriage 207 to be rotated to a vertical position (FIG. 23). As the stick positioner continues to move, the stick in the trough is pressed against the stick door 193 thereby opening same to allow removal of the stick 17. In order to prevent the stick 17 from being thrown out of the stick positioner fingers 197 as the carriage 207 is rotated from the vertically oriented stick carrying position to the horizontally oriented stick placing position, a stick retaining bail 220 is provided on the stick positioner 12. The illustrated bail member 220 includes a pair of pointed hook members 221 interconnected by a shaft portion 222 which is rotatably mounted on the stick carriage 207. Referring to FIG. 24, the bail member 220 is rotated into and out of engagement with a stick on the stick positioner 12 by means of an air cylinder positioned at one end of the carriage 207 and which is connected to one of the hook members 221.

The stick positioner 12 is moved between the inner and outer ends 217 and 218 of the tracks 205 by a cylinder 226 connected between portions of the harvester subframe 5 and the shuttle 204 (FIG. 7). A fulcrum lever 227 is pivotally connected to a fulcrum joint 228 on the stick magazine frame 175 and has the cylinder 226 connected to a middle portion thereof. A link 229 is pivotally connected between the lever 227 and the shuttle 204. Upon the extension of the cylinder 226, the lever 227 is pivoted about the joint 228 such that the shuttle 204 is retracted away from the stick pivoter 14. Conversely, when the cylinder 226 is retracted, the stick positioner assembly is moved toward stick pivoter 14.

In the illustrated harvester 1, during the positioning of a tobacco stick 17 on the stick pivoter 14, it is necessary to swing the stalk conveyor 112 out of the way in order to provide clearance for the stick. Additionally, it is required that the conveyor 112 be swung out of the way to prevent the stick 17 from catching on the fingers 122 of the conveyor 112 as the stick pivoter 14 is pivoted. Referring to FIG. 7, the conveyor 112 is mounted for rotation about a vertical axis by the retraction of a conveyor pivoting cylinder 232 which is connected between the harvester subframe 5 and the conveyor 112. The conveyor 112 continues to operate even in its swung away position (illustrated in phantom in FIG. 7) to simplify the connection of driving rotation to the drive sprocket 117 of the conveyor 112.

As will be described in more detail hereinafter, a stick full switch 235 is positioned on the harvester subframe 5 to detect the movement of a stalk to the extrememost position of the tobacco stick 17. When the stalk engages the stick full switch 235, the conveyors 113 and 136 on the stick pivoter are halted; the cylinder 166 is operated to deploy the clamp fingers 160 to retain the stick 17 on the conveyor 113; the stick positioner 12 is retracted to retrieve another stick from the magazine 11; the cylinder 232 is operated to swing the conveyor 112 out of the way; and the plant stabilizer cylinder 171 is operated to deploy the plant stabilizer 170—all in preparation to pivot the plant loaded stick 17 to a vertical position. The stick positioner 12 includes a stick positioner abutment 236 on the carriage 207 to prevent the stick 17 from being moved longitudinally of the subframe 5 during the loading of plants thereon. A stick pivoter abutment 237 is positioned slightly aft of the abutment 236 in order to provide vertical support to the stick 17 which otherwise might slide vertically under the weight of the plants thereon after the stick has been pivoted to a vertical orientation.

During the loading of plants on the stick 17, the fingers 197 of the stick positioner 12 cooperate with the fingers 123 of the conveyor 113 to vertically support the stick 17. For this reason, the fingers 197 are pivotally connected to the carriage 207 and are resiliently held in extending relation toward the stick pivoter 14 by the cooperation of springs 239 and gussets 240. In this way, the fingers 197 may be urged out of the way by contact of the stalks moving along the stick 17 (see FIGS. 7 and 22). When the stalk has been moved past a finger 197, the spring 239 urges the spring back to its extended position in contact with the gusset 240 associated therewith.

While it would be possible for the stick setter 15 to insert a vertically oriented stick into the ground with enough force to penetrate the ground so that stick would remain standing, in the illustrated harvester 1 it is preferable to form a hole in the ground to receive the vertically oriented stick to avoid stresses on the plants and the stick 17 and to simplify the mechanics of the stick setter 15. Referring to FIGS. 7 and 25, a hole punch mechanism 242 is illustrated. The punch 242 includes an arm 243 pivotally connected to the harvester subframe 5 for pivoting about a vertical axis. At the end of the arm 243, a pair of parallel links 244 and 245 are pivotally connected. The upper link 244 is a bell crank and includes a lever arm 246 extending therefrom. A punch member 247 is pivotally connected to the outward ends of the links 244 and 245 and is oriented vertically. A cylinder 248 is connected between an outer end of the lever arm 246 and a shaft 249 which forms the pivot joint of the punch mechanism 242. Upon the extension of the cylinder 248, the parallel links 244 and 245 are pivoted thereby lowering the punch member 247 into the ground. The punch mechanism 242 is mounted for pivoting about a vertical axis because the harvester 1 is normally moving during formation of a hole in the ground. Thus, there is movement of the harvester 1 from the time that the punch member 247 is lowered into the ground to the time when the punch member is retracted to clear the hole to receive the tobacco stick from the stick setter 15. A spring member 250 (FIG. 7) is connected between the arm 243 and the magazine frame 175 to return the punch mechanism 242 to its lateral position after the withdrawal of the punch mechanism from the ground. The returning of the punch mechansim to its original lateral position assures that there is no interference between the punch mechanism and the stick during the insertion of the stick into the ground.

In order to sense the point at which the punch member is below the stick held by the stick setter 15, a punch mechanism limit switch 251 is positioned on a pivot bracket which supports the punch mechansim 242. The switch 251 is operated upon the engagement of a switch operator 253 extending from a portion of the cylinder 248 when the punch member 247 is directly below the stick 17 held by the stick setter 15. The switch 251 is preferably interconnected with the stick setter 15 such that the stick setter is activated to set the stick in the ground as the punch mechanism 244 is retracted and snaps back into place under the influence of the spring 250.

FIGS. 7 and 26 through 29 illustrate details of the stick setter mechanism 15. The stick setter mechanism functions to draw the plant loaded stick 17 away from the stick pivoter 14 and to lower the stick into a hole formed by the punch mechanism 242. In the illustrated harvester 1, a pair of upper and lower stick setter brackets 257 are mounted on a rear end of the magazine frame 175. A pair of parallel vertical guide rails 258 extend between the brackets 257 and have vertical sleeves 259 slidably received thereon. A pair of parallel horizontal guide sleeves 260 are connected to the vertical sleeves 259 and form a vertically movable stick setter frame 261. A vertical cylinder 262 is connected between one of the brackets 257, such as the upper bracket, and the stick setter frame 261. Extension and retraction of the cylinder 262 is operative to lower and raise the frame 261. A horizontally movable stick setter frame 264 includes a stick setter standard 265, a pair of vertically spaced parallel extension rails 266 slidably received in the horizontal sleeves 260, and an end piece 267 connecting the ends of the extension rails 266. An upper stick gripping hand 268 is positioned on an upper end of the standard 265 and a similar lower hand 269 is positioned on the lower end thereof. A horizontal cylinder 270 is connected between the vertically movable frame 261 and the horizontally movable frame 264 and is operative to extend and retract the frame 264.

The frame 264 is required to assume three positions including a parked position (full lines in FIG. 26), a fully exended stick receiving position (phantom lines FIG. 26), and a stick setting position (full lines FIG. 27). In order to simplify the control arrangement for causing the horizontal cylinder 270 to assume such positions, the cylinder 270 may be a two-stage cylinder. For reasons of economy, the stick setter 15 illustrated in FIGS. 26 and 27 employs a second horizontal cylinder 271 in end-to-end relationship with the first horizontal cylinder 270. The second cylinder 271 has one end connected to the first cylinder 270 and the other end connected to the stick setter standard 265. The second cylinder 271 includes a guide structure therefor including a pair of cylinder guide rails 272 connected by end pieces 273, the guide rails 272 being received in guide sleeves 274 positioned on the vertically movable frame 261. Upon the extension of the first cylinder 270, the second cylinder 271 along with the guide rails and end pieces connected thereto are extended laterally of the subframe 5. This positions the standard 265 at the stick setting position. When the second cylinder 271 is extended, the standard 265 is fully extended to the stick retrieving position for grouping a stick on the stick pivoter 14.

Referring particularly to FIGS. 28 and 29, each of the stick gripping hands 268 and 269 includes a pair of stick gripping fingers 276 and 277 which are pivotally mounted on a hand plate 278 positioned at the upper end or lower end of the stick setter standard 265. Fingers 276 and 277 are connected by intermediate links 279 to an actuating link 280 connected to the plunger 281 of a single acting spring return air cylinder 282. Preferably, the components of the hands 268 and 269 are arranged such that the fingers 276 and 277 are normally in an open position and held in such position by a spring 283 within the cylinder 282. The rearmost finger 276 is preferably straight while the forward finger 277 is curved in order to facilitate the removal of the stick 17 from stick pivoter 14 against the resilient grip of the clamp fingers 160, and to provide complete clearance of the stick 17 by the straight finger 276 after the stick 17 has been set into the ground and the fingers 276 and 277 have been moved to their open position. Referring to FIG. 7, the harvester subframe 5 may be provided with a stick setter door 286 to provide a smooth transition from the canvas conveyor 135 during the pivoting of the stick by the pivoter 14. The door 286 is then opened by a cylinder 287 to allow the stick setter 15 to be extended to remove the stick from the pivoter 14. The operation of the stick setter 15 is coordinated with the pivoting of the stick pivoter 14 and with the operation of the punch mechanism 242.

Summarizing the general operation of the tobacco harvester 1: the harvester 1 approaches a double row of tobacco plants and harvests the plants by severing the stalks thereof, impaling a group of the plants on a horizontally oriented tobacco stick, pivots the stick from horizontal to vertical, and sets the plant loaded stick into the ground for subsequent retrieval. Internally, the stalk gripping conveyors 48 and 49 initially grip the stalk of the standing plant and in cooperation with the impaling conveyor 90 and the star wheel 52 convey the stalk into the cutting blade 68 and 69. In the meantime, the stub trimmer blade 70 trims the stub of the previously cut tobacco plant to prevent interference between the stub and a stalk channel 289 which extends the length of each harvester sub unit 3 or 4 beneath the stalk conveyor path 148 to protect the stalks from engagement with objects on the ground which might otherwise upset the plants within the harvester 1. The impalement conveyor 90 and star wheel 52 or impaler arm 95 convey the stalk of the just cut plant into impalement with the stalk spear 9. As the stalk approaches each spear supporting cylinder 75, the stalk engages a sensor arm 81 which causes retraction of the associated cylinder to allow the stalk to pass thereby on the spear 9. The stalk is conveyed toward the stick pivoter by the stalk conveyors 110, 111 and 112 and are conveyed onto a tobacco stick 17 positioned on the stick pivoter 14.

When the required number of plants have been loaded onto the stick 17, the conveyor 112 is swung to a lateral position, the clamp fingers 160 are applied to the stick on the pivoter 14, the stick positioner is retracted, the plant stabilizer 170 is deployed to a lateral position, and the stick pivoting cylinder 157 is activated to pivot the frame 114 such that the stick 17 is pivoted to a vertical orientation. The hole punch cylinder 248 is activated to drive the punch member 247 into the ground and the stick setter standard 265 is extended toward the vertical stick. As the stick setter is extended, the fingers 276 and 277 are in an open position and upon reaching the vertically oriented stick are closed thereon. The stick setter standard is retracted to a middle position between the fully extended position and parked position to prepare for setting in the ground. As the hole punch mechanism 242 is rotated to a position such that the punch member 247 is directly below the stick 17, the punch mechanism is retracted from the hole and snaps back into place. At this point, the vertical cylinder 262 of the stick setter 15 is extended to set the stick into the hole formed by the punch mechanism 242, and the fingers 276 and 277 are opened to release the stick 17 from the setter 15. The stick setter standard 265 is retracted and raised to its parked position, and the stick setter door 286 is closed.

Since the harvester 1 approaches the standing tobacco plants continuously and because there is a limit to how fast the stick pivoter 14 can be pivoted with a loaded stick thereon without damaging the plants during pivoting, the timing of the movement of plants through the harvester 1 is critical to the proper operation thereof. Referring particularly to FIG. 13 and generally to FIGS. 4 and 7, the first hyrdaulic motor 126 is operated continuously at a relatively slow speed. The fourth motor 129 is also operated continuously but at a relatively fast speed. The second and third motors 127 and 128 are each two-speed motors and are operated at the relatively slow or fast speed as conditions dictate. In order to sense the position of stalks along the stalk conveyor path 148, each of the harvester units 3 and 4 is provided with a first stalk sensor switch 291, a second stalk sensor switch 292, and a third stalk switch 293 in addition to the stick full switch 235 which is a fourth stalk sensor switch. The first three switches 291 through 293 are positioned close to the second, third, and fourth spear supporting cylinders 75 and may be ganged respectively therewith for operation by the sensor arms 81 thereof. The sensor switches 291 through 293 and 235 are interconnected with a set of stalk counters 295 which are connected with an overall control system 296 of the harvester 1. The stalk counters 295 and control system 296 may comprise a digital computer or other type of control system which is operative to control the functions of the harvester 1 as needed.

In the harvester 1, six tobacco plants are loaded on each tobacco stick 17. When the first stalk engages the first switch 291, the conveyors 110, 111, and 112 synchronize with the low speed of the impalement conveyor 90. When the sixth stalk engages the second switch 292, the conveyors 110, 111 and 112 synchronize with the fast speed of the stick loading conveyor 113 to move the group of six stalks quickly onto the stick 17 positioned on the pivoter 14. When the sixth stalk engages the third switch 293, the conveyor 110 synchronizes again with the slow speed of the impalement conveyor 90. This allows the first group of six stalks to continue moving quickly while the new standing plants are cut and moved slowly into the harvester 1. This also creates a gap between the first six stalks and the seventh stalk. When the first stalk of the first group of six engages the stick loaded switch 235, the conveyors 111 and 112 resynchronize with the slow speed of the impalement conveyor such that the new plants which are being cut and impaled are moved slowly toward the stick pivoter 14 while the pivoter is pivoting. By properly timing the pivoting cycle to complete before the sixth stalk of the second group engages the second switch 292, the harvesting cycle may be repeated with the stalks being impaled slowly until six have been loaded and then quickly moved to the stick pivoter while the harvester 1 continues to engage the standing plants.

It is to be understood that while certain forms of the present invention have been illustrated and described herein, it is not to be limited to the specific forms or arrangement of parts described and shown.

What is claimed and desired to be secured by Letters Patent is as follows:

1. A tobacco harvesting apparatus comprising:
   (a) a mobile frame;
   (b) cutter means for severing the stalks of tobacco plants;
   (c) impaler means for impaling said plants through their stalks onto a horizontally supported tobacco stick;
   (d) stick pivot means for pivoting the plant loaded stick to a vertical orientation; and
   (e) stick setter means for placing the plant loaded stick upstanding into the ground.

2. An apparatus as set forth in claim 1 wherein:
   (a) said stick pivot means supports said stick during the loading of plants thereon; and including:
   (b) a stick magazine storing a supply of tobacco sticks; and
   (c) stick positioner means transferring said sticks one at a time from said stick magazine to said stick pivot means.

3. An apparatus as set forth in claim 1 wherein:
   (a) said apparatus engages standing tobacco plants at a substantially constant rate for the harvesting of same; and (b) said frame includes timing and grouping conveyor means extending between said cutter means and said stick setter means and cooperating with said impaling means and said stick pivot means to load a group of a selected number of plants onto a tobacco stick and to time the movement of subsequent plants between said cutter means and said stick pivot means to allow the pivoting and setting of a previously loaded stick with said group of plants thereon.

4. A stalk plant harvesting apparatus for impaling a plurality of stalk plants on a harvesting stick and comprising:
   (a) a mobile harvester frame means having a longitudinal axis in a direction of travel of said frame means;
   (b) cutter means on said frame means for severing the stalks of standing plants to be harvested;
   (c) stick support means for supporting a harvesting stick at a horizontally longitudinal orientation on said frame means;
   (d) impaler means on said frame means for impaling a plurality of severed plants on said stick through the stalks thereof;
   (e) stick pivot means on said harvester frame means for pivoting said stick about a lateral axis of said harvester frame means;
   (f) pivot motor means connected between said frame means and said pivot means for pivoting said stick from a horizontal orientation to a vertical orientation in response to a selected number of plants being impaled on said stick; and
   (g) stick setter means including stick setter motor means and positioned on said frame means for removing the plant loaded, vertically oriented stick from said stick pivot means and setting said stick penetratingly into the ground in an upstanding orientation.

5. An apparatus as set forth in claim 4 wherein said stick setter means includes:
   (a) an extendible stick setter arm supported on said frame means;
   (b) a stick setter arm motor operatively connected between said arm and said frame means for extending and retracting said stick setter arm;
   (c) a stick setter motor operatively connected between said arm and said frame means for lowering and raising said arm; and
   (d) a stick gripper hand on said arm for gripping a vertically oriented stick upon the extension of said arm and for releasing said stick subsequent to the lowering of said arm and the setting of said stick into the ground.

6. An apparatus as set forth in claim 4 wherein said stick setter means includes:
   (a) a stick setter frame mounted on said harvester frame means for vertical movement thereon;
   (b) a stick setter motor connected between said harvester frame means and said stick setter frame and operative to lower and raise said stick setter frame;
   (c) a stick setter arm mounted on said stick setter frame, said arm being extendible laterally of said harvester frame means from said stick setter frame;
   (d) a stick setter arm motor connected between said arm and said stick setter frame for laterally extending and retracting said arm; and
   (e) a stick gripper hand on said arm for gripping said vertically oriented stick upon the extension of said arm and for releasing said stick subsequent to the lowering of said arm and the setting of said stick into the ground.

7. An apparatus as set forth in claim 6 wherein said stick setter means includes:
   (a) said stick setter arm being a first stick setter arm; and
   (b) a second stick setter arm substantially identical to said first stick setter arm and including a respective stick gripper hand, said second arm being connected to said stick setter frame in spaced apart parallel relation to said first arm and operating in unison therewith.

8. An apparatus as set forth in claim 4 wherein said stick setter means includes:
   (a) a pair of elongated vertical stick setter guides positioned in laterally spaced relation on said harvester frame means;
   (b) a pair of elongated horizontal stick setter guides slidably mounted on said vertical guides, said horizontal guides being interconnected in vertically spaced relation and being laterally oriented;
   (c) a vertical stick setter motor connected between said harvester frame means and said horizontal guides and operative to lower said horizontal guides to a stick setting level and to raise same to a stick gripping and setter storing level;
   (d) a pair of stick gripper arms slidably engaged respectively with said horizontal stick setter guides;
   (e) horizontal stick setter motor means connected between said horizontal guides and said stick gripper arms and operative to extend said arms to a stick gripping position, to retract said arms to a stick setting position, and to retract said arms to an arm storing position; and
   (f) a pair of stick gripper hands positioned on said gripper arms and operative to grip a vertically oriented harvesting stick to remove same from said stick pivot means upon the extension of said gripper arms and to release said stick upon the lowering of said horizontal guides.

9. An apparatus as set forth in claim 8 wherein said horizontal stick setter motor means includes:
   (a) a first horizontal extendible ram;
   (b) a second horizontal extendible ram;
   (c) said first and second rams being connected in line with said first ram having one end connected to said horizontal guides and said second ram having one end connected to said stick gripper arms whereby said arms are translated between said arm storing position and said stick setting position by the operation of one of said rams and said arms are translated between said stick setting position and said stick gripping position by the operation of the other of said rams.

10. An apparatus as set forth in claim 4 including:
    (a) hole puncher means positioned on said apparatus and operative to form a hole in the ground to receive said vertically oriented stick from said stick setter means.

11. An apparatus as set forth in claim 4 including:
    (a) harvesting stick supply means; and
    (b) an automatic stick positioner operative to receive one stick at a time from said supply means, to position said stick on said stick pivot means, and to provide support to said stick during the impaling of plants thereon.

12. An apparatus as set forth in claim 11 wherein:

(a) said stick supply means is a gravity feed stick magazine.

13. An apparatus as set forth in claim 11 wherein said automatic stick positioner includes:
(a) stick positioner guide means on said harvester frame means extending laterally between said stick supply means and said stick pivot means;
(b) a stick carriage positioned on said guide means for translation thereon laterally of said harvester frame means, said carriage being operative to receive a stick from said stick supply means and to position same on said stick pivot means; and
(c) stick carriage motor means connected between said stick carriage and said harvester frame means and operable to translate said carriage along said guide means between said stick supply means and said stick pivot means.

14. An apparatus as set forth in claim 13 wherein said stick positioner includes:
(a) a stick gripper rotatably mounted on said carriage;
(b) a stick gripper rotation lever extending from said gripper;
(c) a first gripper rotation lug on said harvester frame means for engagement by said lever upon said carriage approaching said stick supply means for rotation of said gripper to a stick engaging position to receive a stick from said stick supply means; and
(d) a second gripper rotation lug on said harvester frame means for engagement by said lever upon said carriage approaching said stick pivot means for rotating said gripper to a stick placing position to position said stick on said stick pivot means.

15. An apparatus as set forth in claim 14 including:
(a) detent means associated with said gripper to resiliently retain said gripper in each of said stick engaging and stick placing positions.

16. An apparatus as set forth in claim 13 including:
(a) a stick gripper bail on said carriage for engagement with a stick on said carriage subsequent to said carriage receiving said stick from said stick supply means, said bail being released from engagement with said stick upon said stick being positioned on said stick pivot means.

17. An apparatus as set forth in claim 11 wherein said stick supply means includes:
(a) a stick magazine supporting a plurality of sticks in a vertical stack, said sticks being aligned longitudinally of said harvester frame means;
(b) a stick loading trough positioned below said vertical stack, said trough being sized to receive a single stick therein;
(c) said trough having a gate on a side thereof which faces said stick pivot means, said gate being resiliently urged toward a closed position and covering a side opening in said trough which is sized to pass a single stick therethrough;
(d) said trough having an opposite side wall on an opposite side of said trough from said gate and having a bottom wall;
(e) notch means formed on said opposite wall and said bottom wall to provide clearance for said stick positioner to engage a stick in said trough through said notch means and push said stick through said gate to receive said stick on said stick positioner; and
(f) said magazine being sized to allow said vertical stack to descend by gravity to position another stick in said trough subsequent to the pushing of a stick through said gate by said stick positioner.

18. An apparatus as set forth in claim 17 wherein said stick positioner includes:
(a) stick positioner guide means on said harvester frame means extending laterally between said stick supply means and said stick pivot means;
(b) a stick carriage positioned on said guide means for lateral translation thereon;
(c) stick carriage motor means connected between said stick carriage and said harvester frame means and operable to translate said carriage along said guide means between said stick supply means and said stick pivot means;
(d) a stick gripper rotatably mounted on said carriage, said gripper including pivotally mounted and resiliently extending stick gripping fingers to allow stalks of plants to be slid in impaled relation thereby on a stick gripped by said fingers;
(e) a stick gripper rotation lever extending from said gripper;
(f) a first gripper rotation lug on said harvester frame means for engagement by said lever upon said carriage approaching said stick supply means for rotation of said gripper to an upwardly inclined stick engaging position to engage a stick in said trough;
(g) said fingers being positioned in spaced apart relation to engage a stick in said trough through said notch means, said gripper being rotated to an upright stick receiving position upon said fingers engaging said stick in said trough; and
(h) a second gripper rotation lug on said harvester frame means for engagement by said lever upon said carriage approaching said stick pivot means for rotating said gripper to a substantially horizontal stick placing position to place and hold a stick on said stick pivot means.

19. An apparatus as set forth in claim 17 wherein:
(a) said magazine includes a plurality of the vertical stacks in lateral side-by-side relation;
(b) said trough includes a stick retaining panel extending therefrom toward said stick pivot means;
(c) trough guide means on said harvester frame means supports said trough and said panel; and
(d) trough motor means is connected between said trough and said harvester frame means and is operative to position said trough initially under a first stack of said vertical stacks which is farthest from said stick pivot means with said panel under the remaining stacks to support same until said first stack has been exhausted and thereafter to position said trough under the remaining stacks moving sequentially in a direction toward from said stick pivot means as each remaining stack is exhausted.

20. An apparatus as set forth in claim 19 wherein said trough motor means includes:
(a) a rotary trough motor mounted on said harvester frame means, said trough motor having a trough motor shaft;
(b) a jackscrew rotatably mounted on said harvester frame means and connected to said trough motor shaft;
(c) a threaded nut connected to said trough and threaded on said jackscrew;
(d) a plurality of stack empty switches positioned respectively for engagement by the bottom stick in the associated vertical stack, interconnected with said trough motor, and operative in sequence upon the removal of the last stick of a vertical stack to cause the activation of said trough motor to move said trough to the next vertical stack; and
(e) a plurality of trough position switches positioned in respective spaced relation to each vertical stack, interconnected with said trough motor and said stack empty switches, and operative upon engagement by said trough to deactivate said trough motor to cause said trough to stop under said next vertical stack.

21. An apparatus as set forth in claim 4 wherein said stick pivot means includes:
(a) a stick pivot frame mounted on said harvester frame means for pivoting about a lateral axis of said frame means;
(b) a stick loading conveyor on said pivot frame, said stick loading conveyor providing support to a horizontally longitudinal stick, receiving plants from said impaler means, and loading them in spaced apart relation on a stick supported by said stick loading conveyor;
(c) a stick stop engaged by said stick to prevent axial movement of said stick during movement of stalks along said stick by said conveyor; and
(d) said pivot motor means being connected between said pivot frame and said harvester frame means for pivoting said frame to vertically orient the plant loaded stick.

22. An apparatus as set forth in claim 21 wherein said stick loading conveyor includes:
(a) an endless chain trained about a pair of spaced apart sprockets;
(b) a plurality of stalk pushers spaced along said chain, each pusher having an upper finger and a lower finger for engaging a stalk on a stick supported by said conveyor above and below said stick on a run of said chain adjacent said stick, the lower fingers of the pushers on said run providing support to said stick; and
(c) a stick loading conveyor motor connected to one of said sprockets and operable to drive said conveyor.

23. An apparatus as set forth in claim 21 including:
(a) harvesting stick supply means;
(b) an automatic stick positioner operative to receive one stick at a time from said stick supply means and to position said one stick on said stick loading conveyor; and
(c) said stick positioner cooperating with said stick loading conveyor to support said stick during the loading of said plants thereon by said conveyor.

24. An apparatus as set forth in claim 4 wherein said mobile harvester frame means includes:
(a) vehicle frame means including sets of ground engaging wheels;
(b) a vehicle motor operatively connected to a set of said ground engaging wheels to propel said vehicle frame means;
(c) a harvester subframe having the harvesting components mounted thereon; and
(d) subframe connection means adjustably connecting said subframe to said vehicle frame means for varying the height of said subframe relative to the ground.

25. An apparatus as set forth in claim 24 including:
(a) a pair of the harvester subframes connected in side-by-side relation to said vehicle frame means for harvesting two rows of said stalk plants at a time.

26. An apparatus as set forth in claim 4 wherein said cutter means includes:
(a) a stalk gripper conveyor positioned on said harvester frame means and operative to grip a stalk of a standing stalk plant as said plant is approached by said apparatus, said stalk gripper conveyor having a linear speed with respect to said harvester frame means which is substantially equal to the ground speed of said harvester frame means;
(b) a rotary stalk cutter blade rotatably mounted on said cutter means, said stalk gripper conveyor conveying a stalk into said blade to sever said stalk; and
(c) cutter motor means operatively connected to said stalk gripper conveyor and said stalk cutter blade.

27. An apparatus as set forth in claim 26 wherein said blade is an upper stalk cutter blade and including:
(a) a lower stalk stub cutter blade rotatably mounted on said cutter means below said stalk cutter blade, said stub cutter blade trimming the stub of a previously cut stalk to prevent interference between said stub and said apparatus passing thereover.

28. An apparatus as set forth in claim 4 wherein said impaler means includes:
(a) an elongated stalk spear having a pointed front end to pierce and impale plant stalks and a harvesting stick socket at a rear end to receive an end of a harvesting stick therein in colinear relation with said spear when said stick is positioned on said stick pivot means;
(b) a plurality of retractible spear holders mounted on said harvester frame means at locations spaced along said spear, said spear holders extending to engage and support said spear longitudinally of said harvester frame means and retracting to allow a stalk to be slid along said spear therepast;
(c) a stalk sensor associated with each spear holder; said sensor being mounted on said harvester frame means, operatively connected to the associated spear holder, and causing the associated spear holder to retract upon engagement by a stalk on said spear and to extend upon the disengagement of the stalk from said sensor; and
(d) stalk conveyor means mounted on said harvester frame means along said spear; said stalk conveyor means cooperating with said cutter means, conveying said stalk into impaled relation with said pointed front end of said spear, conveying said stalk along said spear, and conveying said stalk onto said stick.

29. An apparatus as set forth in claim 28 wherein said stalk conveyor means includes:
(a) a stalk cutting and impaling first conveyor cooperating with said cutter means to sever the stalk of a standing stalk plant and conveying said stalk into impaled relation on said spear;
(b) stalk timing and grouping intermediate conveyor means receiving each impaled stalk from said first conveyor, moving the stalks along said intermediate conveyor means in timed relation, and grouping said stalks into a number of stalks to be impaled onto a stick on said stick pivot means; and
(c) a stick loading final conveyor receiving the group of stalks from said intermediate conveyor means and loading same onto a stick on said stick pivot means prior to the pivoting of the loaded stick and the setting of same into the ground.

30. An apparatus as set forth in claim 29 wherein:
(a) said final conveyor is mounted on said stick pivot means.

31. An apparatus as set forth in claim 29 wherein:
(a) said first conveyor is connected to a first conveyor motor operating at a relatively slow speed;
(b) said final conveyor is connected to a final conveyor motor operable at a relatively fast speed;
(c) said intermediate conveyor means includes a timing conveyor receiving stalks from said first conveyor and a grouping conveyor transferring said stalks from said timing conveyor to said final conveyor;
(d) a timing conveyor motor is connected to said timing conveyor and a grouping conveyor motor is connected to said grouping conveyor motor, said timing conveyor motor and said grouping conveyor motor being operable at said relatively slow speed in conveyor synchronism with said first conveyor and at said relatively fast speed in conveyor synchronism with said final conveyor;
(e) stalk conveyor control switch means positioned at selected locations along said spear and engaged by stalks upon being conveyed therealong by said stalk conveyor means;
(f) stalk counter means interconnected with said control switch means; and
(g) harvester control means interconnected with said control switch means, said stalk counter means, said timing, grouping, and final conveyor motors, said pivot motor means, and said stick setter motor means and operative to cause in a continuing repetition:
  (1) said timing and grouping conveyor motors to operate at said slow speed until a group of a selected number of stalks has been impaled onto said spear;
  (2) said timing and grouping conveyor motors to operate at said fast speed to move said group toward said stick until the last stalk of said group has been conveyed past said timing conveyor;
  (3) said grouping conveyor motor to continue operating at said fast speed until said group has been transferred to said final conveyor while said timing conveyor motor operates at said slow speed to accumulate stalks from said first conveyor on said timing conveyor;
  (4) said grouping conveyor motor to operate at said slow speed upon said group of stalks being loaded onto said stick by said final conveyor; and
  (5) said pivot motor means to pivot the stalk loaded stick to a vertical orientation, said stick setter means to set said loaded stick into the ground, and said pivot motor means to pivot said stick pivot means to its original orientation.

32. An apparatus as set forth in claim 29 wherein:
(a) the conveyors and conveyor means of said stalk conveyor means are stalk conveyor components and are positioned along said harvester frame means from said cutter means to said stick pivot means in alternation on opposite sides of said spear from one component to the next;
(b) each conveyor component includes an endless chain trained about sprockets spaced longitudinally of said harvester frame means and turning on vertical axes, each chain including a plurality of stalk engaging finger sets spaced therealong and each finger set including an upper finger positioned above said spear and a lower finger positioned below said spear;
(c) each conveyor component laterally overlaps the next conveyor component; and
(d) the conveyor components on one side of said spear have finger sets with the fingers thereof spaced apart a distance to allow the finger sets of the conveyor components on the other side of said spear to pass therethrough to prevent mutual interference between the finger sets of laterally overlapping conveyor components.

33. An apparatus as set forth in claim 28 and including:
(a) wide belt conveyor means in spaced relation on said harvester frame means on opposite lateral sides of said spear, said belt conveyor means including wide belt means having portions oriented in longitudinally vertical relation, said belt conveyor means operating at substantially the same conveyor speed as said stalk conveyor means and engaging leaves of said stalk plants during the conveyance thereof along said spear to prevent frictional and abrasive damage to said leaves during said conveyance.

* * * * *